(12) United States Patent
Huang et al.

(10) Patent No.: US 12,189,179 B2
(45) Date of Patent: Jan. 7, 2025

(54) VERTICAL GRATING COUPLER

(71) Applicant: Taiwan Semiconductor Manufacturing Company, Hsinchu (TW)

(72) Inventors: Tai-Chun Huang, New Taipei (TW); Stefan Rusu, Sunnyvale, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 239 days.

(21) Appl. No.: 17/751,773

(22) Filed: May 24, 2022

(65) Prior Publication Data
US 2023/0384540 A1  Nov. 30, 2023

(51) Int. Cl.
| | |
|---|---|
| *G02B 6/124* | (2006.01) |
| *G02B 6/12* | (2006.01) |
| *G02B 6/34* | (2006.01) |
| *G02B 1/00* | (2006.01) |
| *G02B 6/42* | (2006.01) |

(52) U.S. Cl.
CPC .......... *G02B 6/12002* (2013.01); *G02B 6/124* (2013.01); *G02B 6/34* (2013.01); *G02B 1/002* (2013.01); *G02B 2006/12107* (2013.01); *G02B 6/4215* (2013.01)

(58) Field of Classification Search
CPC ....... G02B 6/12002; G02B 6/124; G02B 6/34
See application file for complete search history.

(56) References Cited

U.S. PATENT DOCUMENTS 3,871,742 A * 3/1975 Kaminow ................ G02B 6/42
385/37
7,221,825 B2   5/2007 Reed et al.
(Continued)

FOREIGN PATENT DOCUMENTS

CN    110824612 A  *  2/2020
CN    210123485 U  *  3/2020
(Continued)

OTHER PUBLICATIONS

P. Dong et al. Compact double-grating coupler between vertically stacked silicon-on-insulator waveguides. Applied Optics, 44:35, 7540-7547, Dec. 10, 2005. (https://doi.org/10.1364/AO.44.007540) (Year: 2005).*

(Continued)

*Primary Examiner* — Michael Stahl
(74) *Attorney, Agent, or Firm* — Lippes Mathias LLP

(57) ABSTRACT

A vertical grating coupler is disclosed. The grating coupler includes a first waveguide having a first grating, a second waveguide having a second grating, and a dielectric layer positioned between the first waveguide and the second waveguide. The first grating includes a plurality of first grating ridges separated by a plurality first grating gaps, and the second grating includes a plurality of second grating ridges separated by a plurality second grating gaps. The first grating, the second grating, and the dielectric layer are located in a vertical overlap region between the first waveguide and the second waveguide. The first grating and the second grating have different grating periods, and each of the plurality of first grating gaps and second grating gaps are filled with the dielectric layer.

20 Claims, 20 Drawing Sheets

(56) References Cited

U.S. PATENT DOCUMENTS

| | | | |
|---|---|---|---|
| 9,715,064 B1* | 7/2017 | Gambino | G02B 6/43 |
| 10,416,385 B1* | 9/2019 | Mikkelsen | G02B 6/12004 |
| 2006/0120667 A1* | 6/2006 | Reed | G02B 6/125 |
| | | | 385/37 |
| 2009/0003762 A1* | 1/2009 | Chiniwalla | G02B 6/124 |
| | | | 385/14 |
| 2011/0091157 A1* | 4/2011 | Yao | G02B 6/13 |
| | | | 385/39 |
| 2015/0063753 A1* | 3/2015 | Evans | H01S 5/12 |
| | | | 438/31 |
| 2015/0260913 A1* | 9/2015 | Li | G02B 6/124 |
| | | | 385/14 |
| 2015/0286008 A1* | 10/2015 | Shimizu | G02B 6/124 |
| | | | 385/37 |
| 2016/0109659 A1* | 4/2016 | Jiang | H01L 31/167 |
| | | | 438/24 |
| 2019/0170938 A1 | 6/2019 | Plantier et al. | |
| 2019/0227230 A1 | 7/2019 | Novack et al. | |
| 2020/0341200 A1 | 10/2020 | Van Vaerenbergh et al. | |
| 2023/0083198 A1 | 3/2023 | Bian et al. | |
| 2023/0384610 A1* | 11/2023 | Huang | G02B 5/1857 |

FOREIGN PATENT DOCUMENTS

| | | |
|---|---|---|
| CN | 113960793 A | 1/2022 |
| TW | 201947265 A | 12/2019 |
| TW | 202004242 A | 1/2020 |
| TW | 202006411 A | 2/2020 |

OTHER PUBLICATIONS

G. Roelkens et al. High efficiency silicon-on-insulator grating coupler based on a poly-silicon overlay. Optics Express, 14:24, 11622-11630, Nov. 27, 2006. (https://doi.org/10.1364/OE.14.011622) (Year: 2006).*

D. Vermeulen et al, "High-efficiency Fiber-to-chip Grating Couplers Realized Using an Advanced CMOS-compatible Silicon-On-Insulator Platform", Optics Express vol. 18, No. 17, published Aug. 10, 2010 by Optical Society of America, USA.

Jahn Hoffmann et al, "Backscattering Design for a Focusing Grating Coupler with Fully Etched Slots for Transverse Magnetic Modes", Scientific Reports, published Dec. 10, 2018 by Nature.com.

* cited by examiner

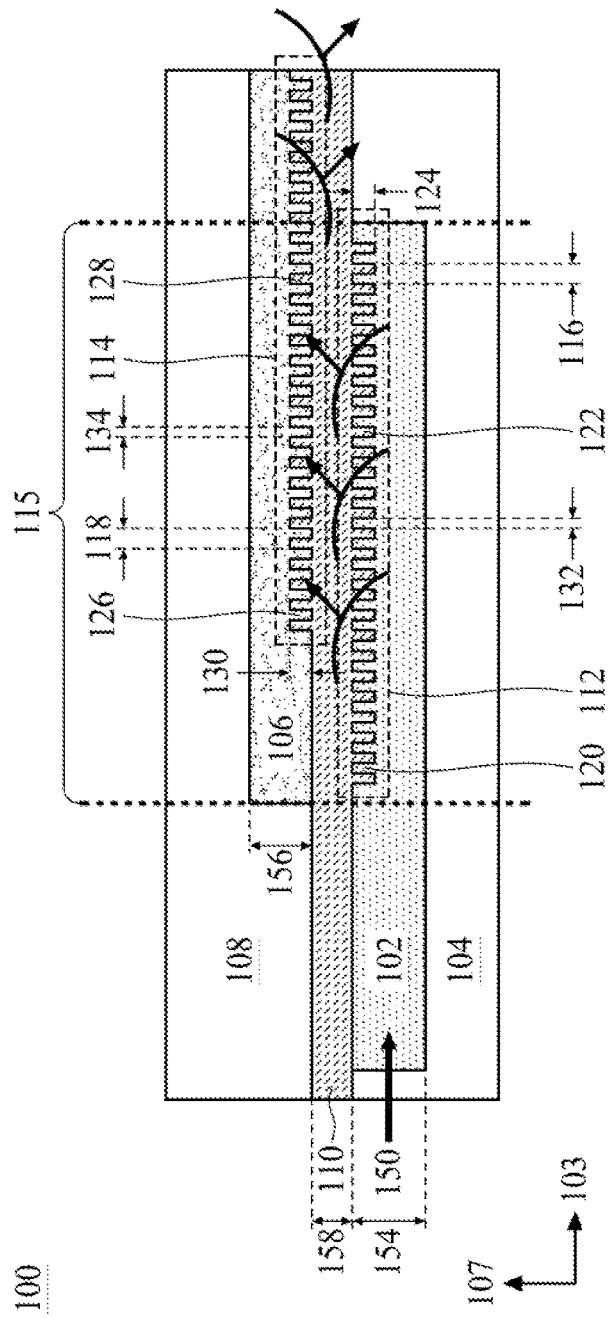
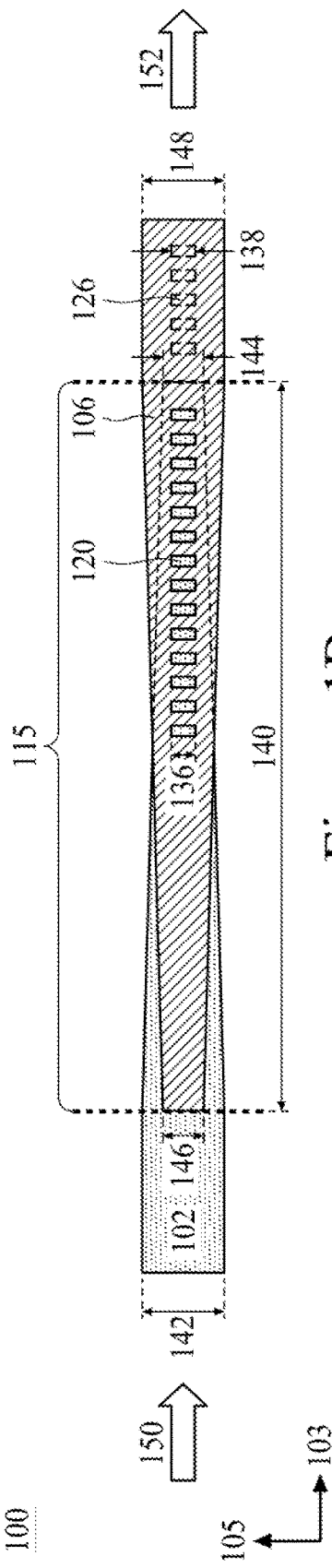
Figure 1A
Figure 1B

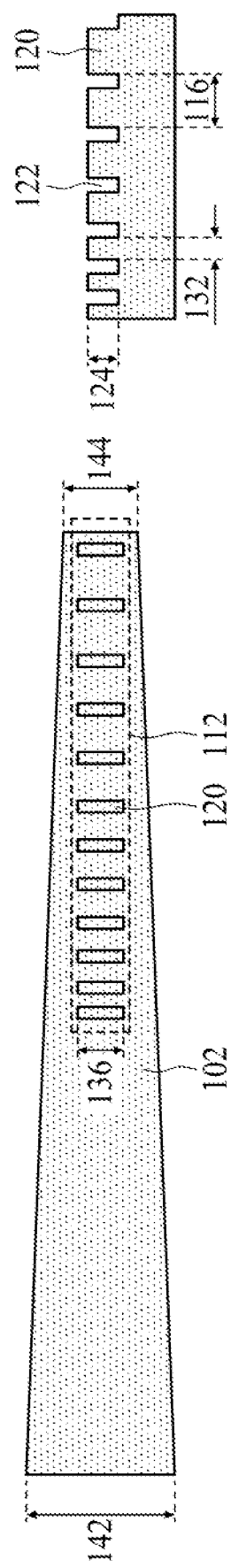

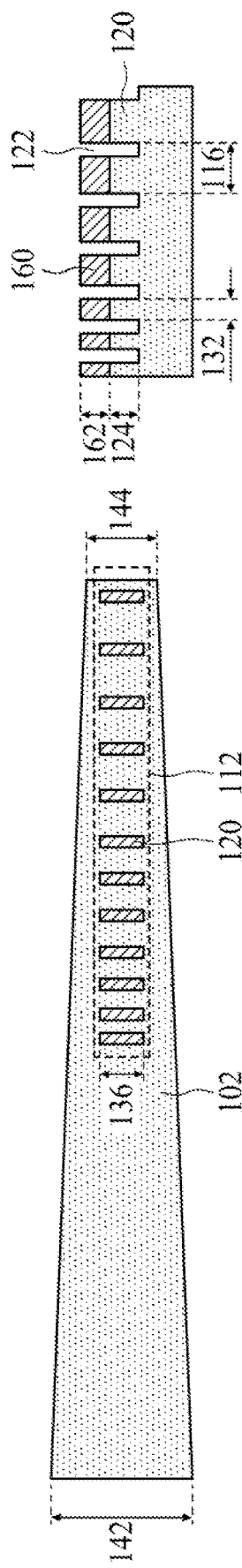
Figure 2A
Figure 2B

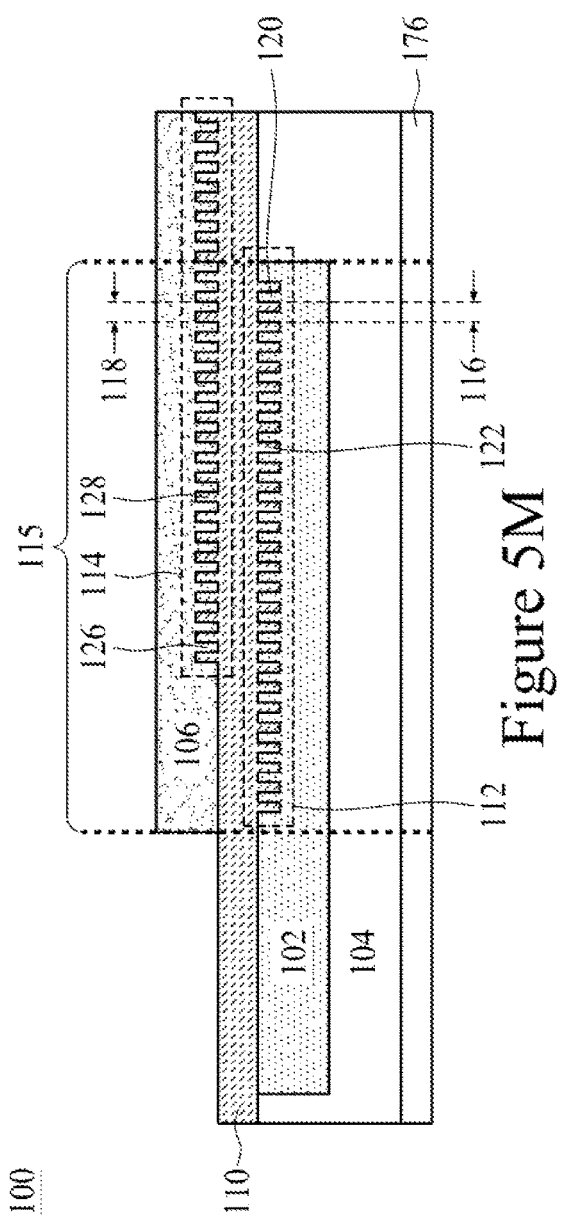
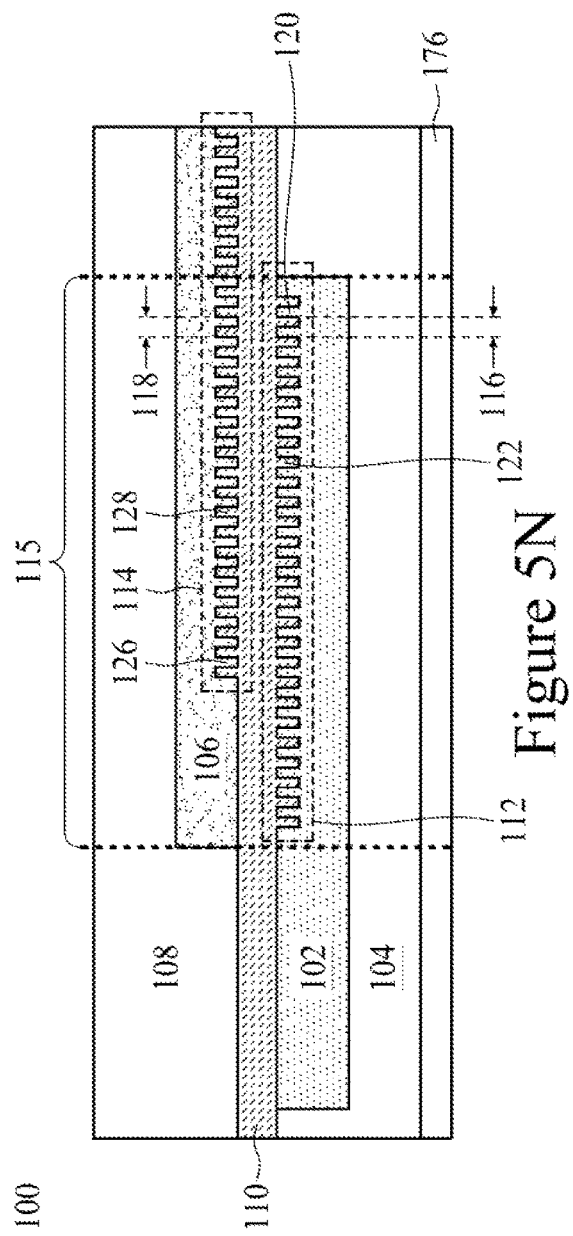

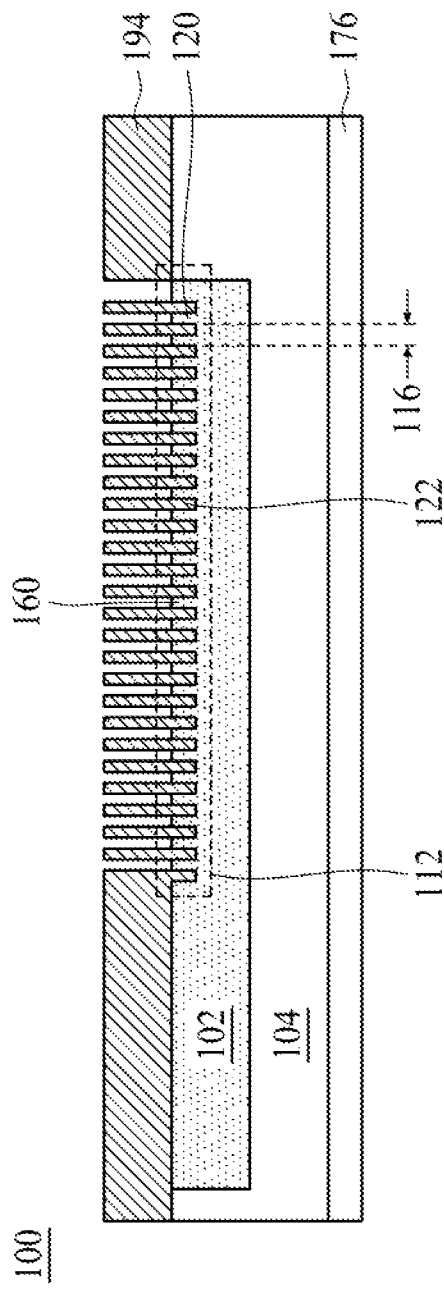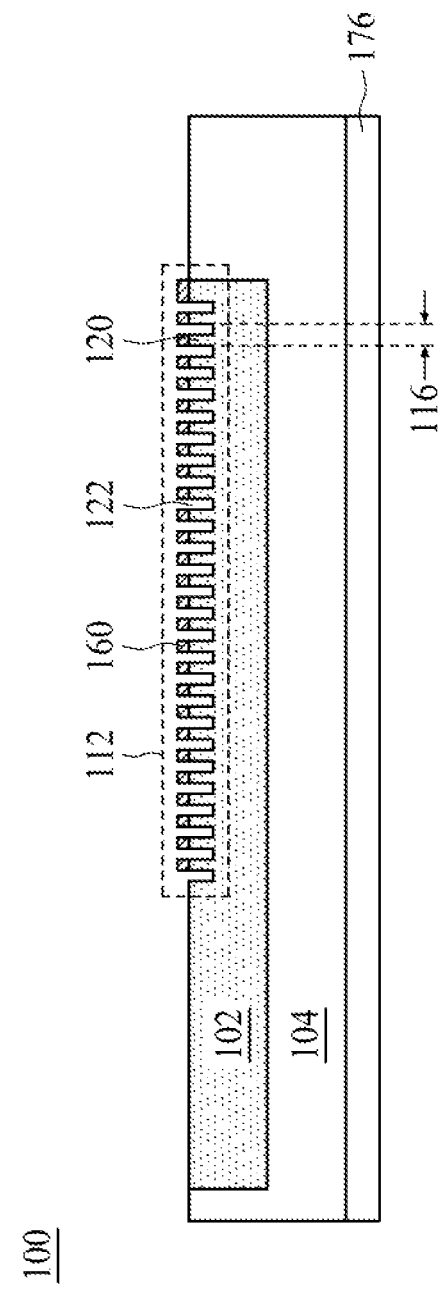

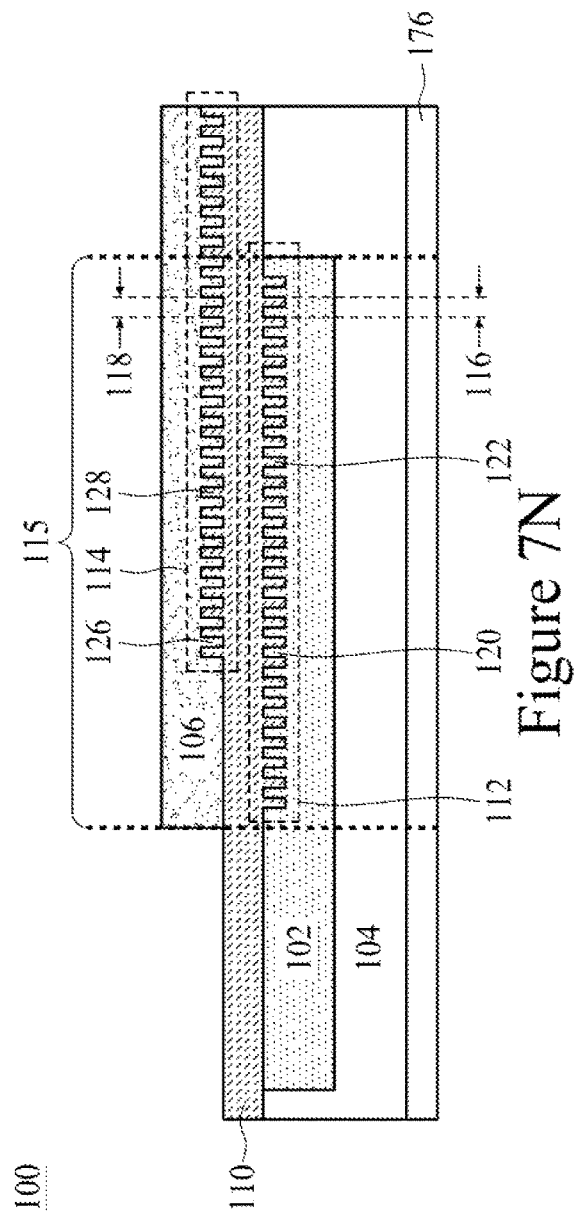
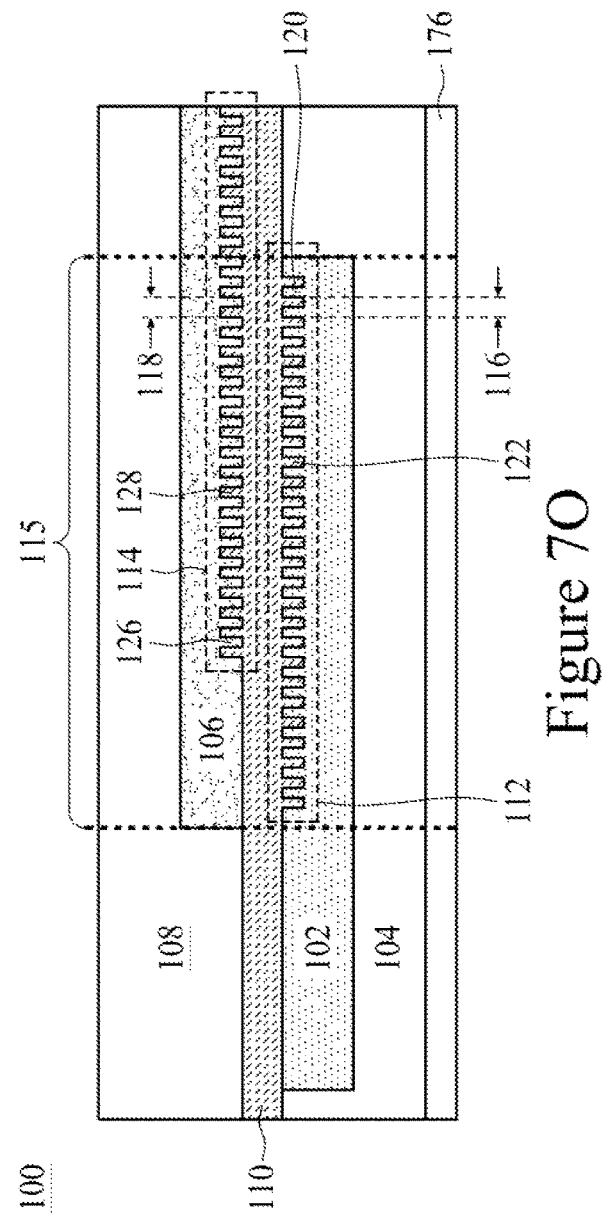

VERTICAL GRATING COUPLER

BACKGROUND

Silicon photonics has quickly become a mainstream technology, particularly in photonic integrated circuits (PICs). Such circuits are based on a silicon-on-insulator (SOI) platform to achieve high speed optical communication.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A-1D are various views of a vertical grating coupler in accordance with some embodiments. FIG. 1A is a cross-sectional side view. FIG. 1B is a top view. FIG. 1C is a partial top view of a first waveguide of the vertical grating coupler. FIG. 1D is a magnified cross-sectional view of the first waveguide of the vertical grating coupler.

FIGS. 2A-2B are various views of a first waveguide used in the vertical grating coupler in accordance with some embodiments. FIG. 2A is a partial top view of a first waveguide of the vertical grating coupler. FIG. 2B is a magnified cross-sectional view of the first waveguide of the vertical grating coupler.

FIG. 3A is a top view of the vertical grating coupler.

FIG. 3B is a partial top view of a first waveguide of the vertical grating coupler.

DETAILED DESCRIPTION

Figure 3A:
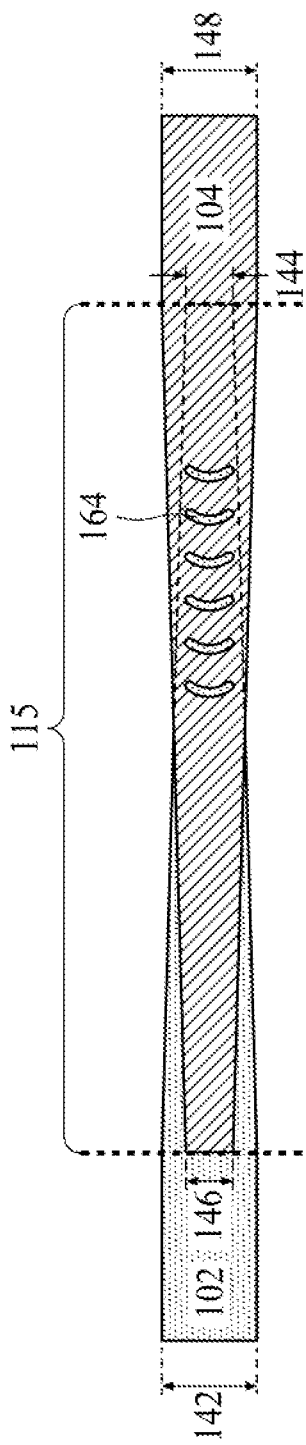
FIGS. 3A-3B are various views of a vertical grating coupler in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Numerical values in the specification and claims of this application should be understood to include numerical values which are the same when reduced to the same number of significant figures and numerical values which differ from the stated value by less than the experimental error of conventional measurement technique of the type described in the present application to determine the value. All ranges disclosed herein are inclusive of the recited endpoint.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The present disclosure relates to photonic devices which are made up of different layers. When the terms "on" or "upon" are used with reference to two different layers (including the substrate), they indicate merely that one layer is on or upon the other layer. These terms do not require the two layers to directly contact each other, and permit other layers to be between the two layers. For example all layers of the photonic device can be considered to be "on" the substrate, even though they do not all directly contact the substrate. The term "directly" may be used to indicate two layers directly contact each other without any layers in between them.

The use of photonic systems has several distinct advantages over prevalent electronic systems, including immunity from electromagnetic interference, no short circuits or ground loops, safe for use in combustible environments, monitoring security, low-loss transmission, large bandwidth capabilities, small size, light-weight, and constructed of inexpensive materials. Similarly, photovoltaic devices or photonic integrated circuits (PICs) provide distinct advantages over similar electronic counterparts including, for example and without limitation, increased bandwidth, expanded frequency (wavelength) division multiplexing, low-loss couplers (including bus-access types), expanded multipole switching (number of poles, switching speeds), smaller size, lower weight, lower power consumption, improved reliability, batch fabrication, improved optical alignment, immunity to vibration, and the like. Examples of such PICs include, without limitation, monolithic integrated optical wavelength demultiplexers, monolithic integrated transmitter (laser) circuits, monolithic integrated repeater chips, hybrid integrated bistable optical devices, integrated distributed feedback (DFB) lasers and modulators, integrated tunable receivers, integrated balanced heterodyne receiver, and the like.

Some of the aforementioned photonic systems may utilize many photonic integrated circuits (i.e., photovoltaic devices), densely packaged. This type of silicon photonic platform is typically implemented as two-dimensional structures, with the waveguide defined in a single layer of silicon. Such implementation presents issues in increasing the integration density of a photonic integrated circuit based upon hundreds (or thousands) of photovoltaic devices for complex chip architecture, e.g., an optical switch structure for an optical phased array, an optical switch to a plurality of multiplexers allowing for coherent communications. In accordance with some embodiments contemplated herein, three-dimensional silicon photonic platforms are described.

For the multiple layers of a three-dimensional photonic platform, there may be a trade-off between inter-layer transition loss and cross-loss/crosstalk. As will be appreciated, the thickness of the energy conversion between the intermediate layers may affect the coupling loss. Previous attempts at three-dimensional photonic platforms experienced cross loss dominating the transition loss between the layers. However, the structures and methods set forth herein overcome these issues, and further reduce optical transmission length, reduce transmission loss in high component density applications, eliminate the influence of the intermediate oxide layer thickness on the manufacturing process, and the like.

FIGS. 1A-1C are different views of one embodiment of the grating coupler of the present disclosure. FIG. 1A is a cross-sectional side view of the entire grating coupler. FIG. 1B is a top view of a portion of the grating coupler of FIG. 1A. FIG. 1C is a partial top view of a first waveguide used in the embodiment of FIGS. 1A-1B. FIG. 1D is a magnified side cross-sectional view of the first grating of the first waveguide in accordance with some embodiments.

Turning now to FIG. 1A and FIG. 1B, there is shown a representative grating coupler 100 used in a photonic device in accordance with some embodiments. As illustrated in FIGS. 1A-1B, the grating coupler 100 comprises a first waveguide 102 formed in a first optical routing layer 104 and a second waveguide 106 formed in a second optical routing layer 108, the second waveguide 106 being positioned above the first waveguide 102. The grating coupler 100 of FIGS. 1A-1B further illustrates the first waveguide 102 having a first grating 112 with a first grating period 116, and the second waveguide having a second grating 114 with a second grating period 118. In some embodiments, the first optical routing layer 104 and the second optical routing layer 108 may be fabricated of a suitable dielectric material having a lower refractive index than the first waveguide 102 and the second waveguide 106. In some particular embodiments, these layers 104, 108 may be manufactured of silicon dioxide ($SiO_2$). For reference, silicon has a refractive index of about 3.6, silicon nitride has a refractive index of about 1.98, and silicon dioxide has a refractive index of about 1.45.

In some embodiments, the first waveguide 102 may be fabricated of a high refractive index or high-K material such as, for example and without limitation silicon nitride ($Si_3N_4$) or silicon. In some embodiments, the second waveguide 106 may be constructed of a high refractive index or high-K material, such as, for example and without limitation silicon nitride ($Si_3N_4$) or silicon. In varying embodiments, the first waveguide 102 and the second waveguide 106 may be constructed of the same material or different materials. For example, the first waveguide 102 may comprise silicon nitride ($Si_3N_4$) and the second waveguide may then comprise silicon (or vice versa). In other examples, the first waveguide 102 and the second waveguide 106 may both be constructed of silicon nitride ($Si_3N_4$) or both constructed of silicon. In varying embodiments, the first waveguide 102 and the second waveguide 106 may be implemented with a thickness within the range of about 10 nm to 1200 nm, denoted in FIG. 1A as the widths 154 and 156, respectively.

As illustrated in FIG. 1A, the grating coupler 100 may further include a dielectric layer 110 positioned between the first waveguide 102/first optical routing layer 104 and the second waveguide 106/second optical routing layer 108 along height axis 107. In some embodiments, the dielectric layer 110 may be constructed of a high-K material, such as, for example and without limitation, zirconium oxide, hafnium oxide, $SiO_2$, silicon oxynitride, aluminum oxide, zirconium silicate, hafnium oxynitride, zirconium oxynitride, boron nitride, hafnium silicate, silicon carbide, silicon, silicon nitride, or other highly refractive dielectric material. In other embodiments, the dielectric layer 110 may be implemented with a thickness 158 within the range of about 1 nm to 1100 nm. Further, although illustrated in FIG. 1A as extending the entire length of the grating coupler 100 along length axis 103, it will be appreciated that the dielectric layer 110 may be implemented with a length defined by the transition between the first waveguide 102 and the second waveguide 106. That is, the dielectric layer 110 may be present solely within the overlapping area of the first waveguide 102 and the second waveguide 106. In some embodiments, the length of the dielectric layer 110 is set in accordance with the length of the transition. In such embodiments, the width of the dielectric layer 110 may be implemented as about 70% to about 130% of the transition width. It will be appreciated that the period 116 or 118 may be altered to control the transition length. Accordingly, the intensity will be Gaussian, with the highest intensity for the center wavelength, such that wavelength power will decrease for the edge wavelengths in the transfer from the first waveguide 102 to the second waveguide 106, but all wavelengths may be transferred, unlike a filter implementation.

The grating coupler 100 of FIGS. 1A-1B further includes a first grating 112 and a second grating 114. The region in which the first waveguide 102 and the second waveguide 106, and the first grating 112 and second grating 114 overlap vertically is labeled herein as a vertical overlap region 115. According to some embodiments, the length of the first grating 112 and/or the second grating 114 may be about 10% to about 100% of the width of the corresponding waveguide 102, 106. In accordance with some embodiments, the first grating 112 and the second grating 114 may be implemented with different periods, i.e., a first grating period 116 and a second grating period 118, respectively. In accordance with other embodiments, the first grating period 116 and the second grating period 118 may be implemented as the same period. As indicated in FIGS. 1A-1B, an optical input 150 is shown entering the first waveguide 102. The optical input 150 passes through the vertical overlap region 115 of the grating coupler 100, transiting through the dielectric layer 110 to the second waveguide 106. That is, the optical input 150 enters into the grating coupler 100 from the left-hand side and travels through the vertical overlap region 115 to the second waveguide 106, wherein the optical input 150 exits the second waveguide 106 as an optical output 152.

As illustrated in FIG. 1B, the first waveguide 102 and the second waveguide 106 may be implemented with different starting (or input) and ending (or output) dimensions. As shown, the first waveguide 102 may be implemented to have a larger starting (or input) width 142 tapering (either straight lined or curved) to a smaller ending (or output) width 144. Similarly, the second waveguide 106 may be implemented to have a smaller starting (or input) width 146 enlarging (either straight lined or curved) to a larger ending (or output) width 148. In accordance with some embodiments, the first waveguide 102 may be implemented with a starting or input width 142 in the range of about 2 micrometers (urn) to about 400 nanometers (nm) and an ending or output width 144 in the range of about 0.5 um to about 200 nm. The second waveguide 106 may be implemented with a starting or input width 146 in the range of about 0.5 um to about 200 nm and an ending or output width 148 in the range of about 2 um to about 400 nm.

As shown in FIGS. 1A-1B, the first grating 112 is formed in the first waveguide 102, and comprises a plurality of first grating ridges 120 separated by a corresponding plurality of first grating gaps 122. The first grating 112 includes a first grating period 116 corresponding to the interval between each first grating ridge 120 and corresponding first grating gap 122, i.e., one convex and one concave portion of the first grating 112. In some embodiments, the first grating gap 122 corresponds to the distance between the rear surface and the front surface of adjacent first grating ridges 120. In accordance with some embodiments, the first grating period 112 may be implemented in the range of about 50 nm to 500 nm, and in some embodiments, within the range of about 100 nm to 400 nm. The first ridges 120 of the first grating 112 are formed of the same material as the first waveguide 102 and the first grating gaps 122 are filled with the material of the dielectric layer 110. As shown in FIG. 1A, the length or thickness of each first grating ridge 120 is indicated with reference numeral 132, and the first grating ridge depth (i.e., height of each first grating ridge) is indicated with reference numeral 124. In accordance with some embodiments, the first grating gap 122 may be implemented in the range of about 1% to about 99% of the first grating period 116, the first grating ridge length 132 may be implemented in the range of 1% to about 99% or about 5% to about 95% of the first grating period 116, and the first grating ridge depth 124 may be implemented in the range of 10% to about 90% of the first grating period 116. In particular embodiments, the width 136 of each first grating ridge 120 is from about 5% to about 99% of the first waveguide ending or output width 144 of the first waveguide 102 (see FIG. 1B).

Continuing with FIGS. 1A-1B, the second grating 114 is formed in the second waveguide 106. The second grating 114 includes a plurality of second grating ridges 126 separated by a corresponding plurality of second grating gaps 128. The second grating 114 includes a second grating period 118 corresponding to the interval between each second grating ridge 126 and corresponding second grating gap 128, i.e., one convex and one concave portion of the second grating 114. The second grating gap 128 corresponds to the distance between the rear surface and the front surface of adjacent second grating ridges 126. In some embodiments, the second grating period 118 may be implemented in the range of about 50 nm to 500 nm, and in some embodiments, within the range of about 100 nm to 400 nm. The second grating ridges 126 of the second grating 114 are formed of the same material as the second waveguide 106 and the second grating gaps 128 are filled with the material of the dielectric layer 110.

As shown in FIG. 1A, the length or thickness of each second grating ridge 126 is indicated with reference numeral 134, and the second grating ridge depth (i.e., height of each first grating ridge) is indicated with reference numeral 130. In accordance with some embodiments, the second grating gap 128 may be implemented in the range of about 1% to about 99% of the second grating period 118, the second grating ridge length 134 may be implemented in the range of about 1% to about 99% or about 5% to about 95% of the second grating period 118, and the second grating ridge depth 130 may be implemented in the range of about 10% to about 90% of the second grating period 118. In particular embodiments, the width 138 of each second grating ridge 126 is from about 5% to about 99% of the second waveguide starting or input width 146 of the second waveguide 106 as shown in FIG. 1B.

As illustrated in FIG. 1B, it is noted that each ridge 120, 126 is generally located within the center of the vertical overlap region 101, first waveguide 102, or second waveguide 106 in the width axis 105. This placement improves the coupling efficiency between the two waveguides 102, 106. It will be appreciated that the overall length of the gratings 112, 114, the length of the ridges 120, 126, and the gaps 122, 128 may vary depending on the wavelengths that are selected for reflection.

Turning now to FIGS. 1C-1D, the first grating 112 is illustrated as being apodized. This refers to grading the refractive index of each ridge 120 to approach zero (relative to the refractive index of the dielectric layer 110) at the end of the grating 112 (i.e., the output of the first waveguide 102). This is done to suppress side lobes that may arise, and to also increase the transmission of the input 150 from the first waveguide 102 to the second waveguide 104. For illustrative purposes, reference is made hereinafter to apodization of the first grating 112, however the skilled artisan will appreciate that the second grating 116 may also be apodized as illustrated of the first grating 112 in FIGS. 1C-1D. As illustrated here, in one method of apodizing the grating 112 utilizes grating spacing apodization, i.e., the spacing or ridge gaps 122 vary in size as illustrated in FIG. 1C. FIG. 1D illustrates duty apodization of the ridges 126 of the grating 112 in accordance with another embodiment. It will be appreciated that when utilizing straight grating as shown in FIG. 1C, the pitch of the ridges 126 is altered.

Referring now to FIGS. 2A-2B, there are shown a partial top view of a first waveguide 102 of the vertical grating coupler 100 (FIG. 2A), and a magnified cross-sectional view of the first waveguide 102 of the vertical grating coupler 100 in accordance with another embodiment of the subject application. As shown in FIGS. 2A-2B, the grating 112 of the first waveguide 102 is apodized as described above in FIGS. 1C-1D. However, the first grating 112 of FIGS. 2A-2B also utilizes an overlay 160 that is deposited and formed on the top of each first ridge 120 of the first grating 112. In this embodiment of the first grating 112, each ridge 120 includes an overlay 160. That is, each ridge 120 is made of two different materials that have different refractive indices. The overlay 160 is applied upon the ridge 120 and has a thickness 162. In particular embodiments, the thickness 162 of the overlay 160 is from about 5% to about 60% of the first ridge depth 124. In some embodiments, the thickness 162 of the overlay 160 may be in the range of about 1 nm to about 750 nm. The overlay 160 is also formed from a dielectric material that has a higher refractive index than the dielectric layer 110, e.g., an oxide or other insulative material. It will be appreciated that the use of the overlay 160 can change the reflected central wavelength of the grating, increase the reflection intensity, and/or increase the bandwidth of the grating 112. In some embodiments, the material comprising the overlay 160 has an index of refraction in the range of about 1.0 to about 4.0.

Figure 3B:
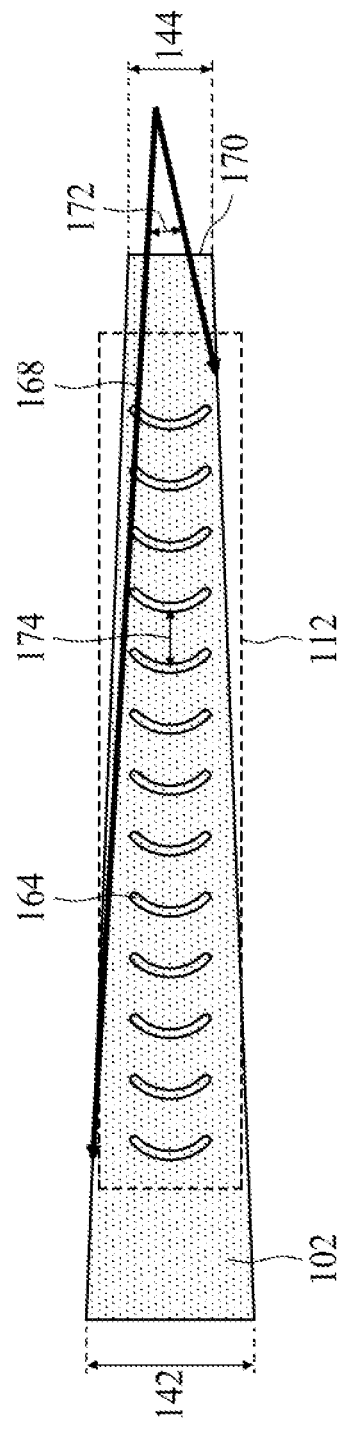

FIGS. 3A-3B illustrate another embodiment of the first waveguide 102 that utilizes a curved ridge 164 implementation. As shown in FIGS. 3A-3B, the ridges 164 have a curved shape when viewed from the top. The ridges 164 of the grating 112 curve outwards from the center of the waveguide 102, with the center of the ridge being closer to the input of the first waveguide than the edges of the ridge. Each ridge 164 has a three-dimensional shape of a partial annular cylinder. An overlay 160 (not shown) may also be applied to the top of the ridges 164 as discussed infra. As will be appreciated, the angle 172 of the grating 112 shown in FIGS. 3A-3B may be implemented in the range of about 10 to about 60 degrees, with an inner radius 170 corresponding to the inner diameter is about 6 um to about 10 um back from the tip end, and the outer diameter is the rate radius (outer radius 168) of the inner diameter plus about 10 um to about 14 um. When apodized, as shown in FIGS. 3A-3B, it will be appreciated that the curved ridge gap 174 and length of the grating 112 using the curved ridge 164 may be changed in accordance with the selected apodization method.

Figure 4:
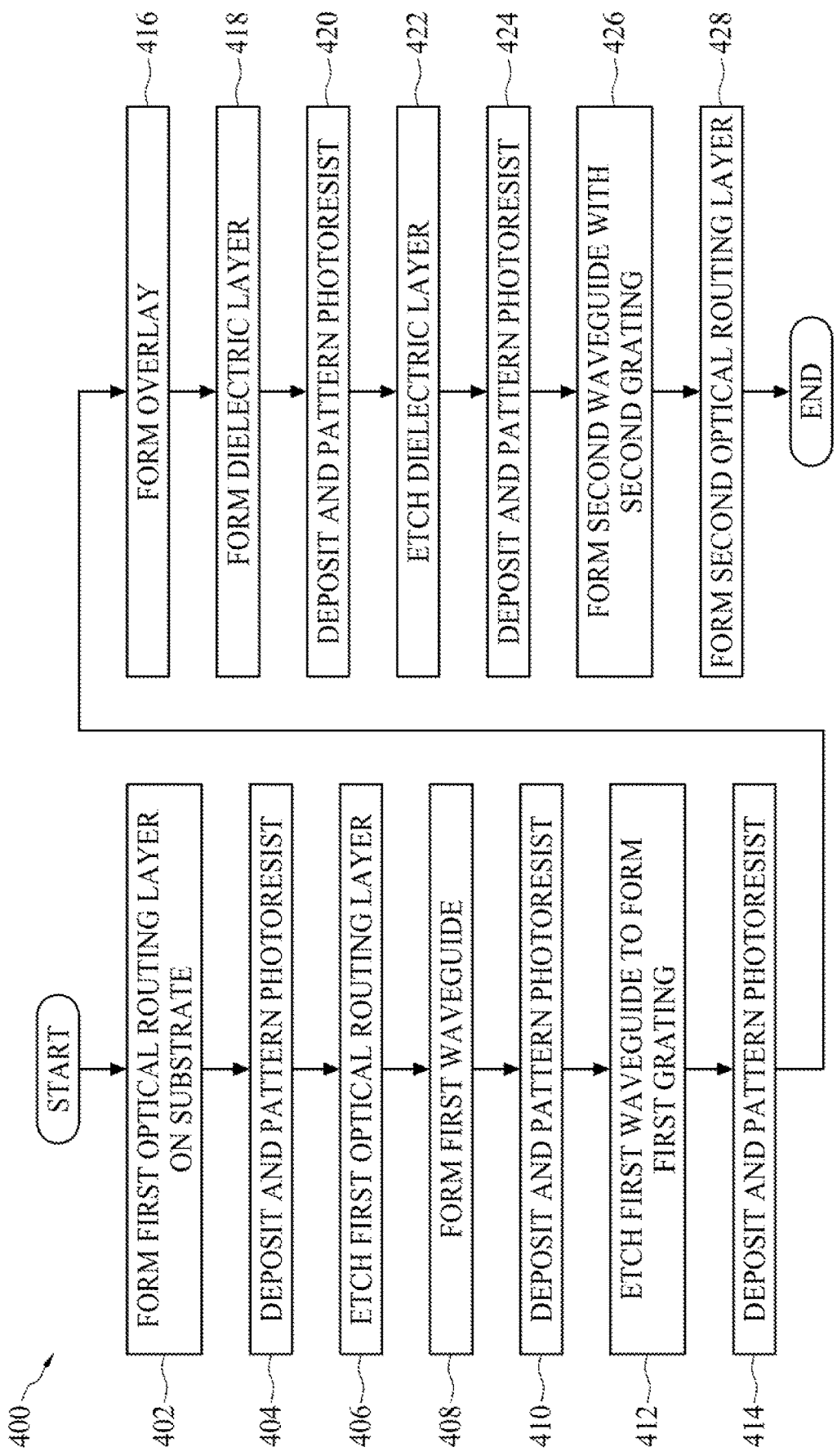
FIG. 4 is a flowchart illustrating a first method for forming the vertical grating coupler in accordance with some embodiments.
Figure 5A:
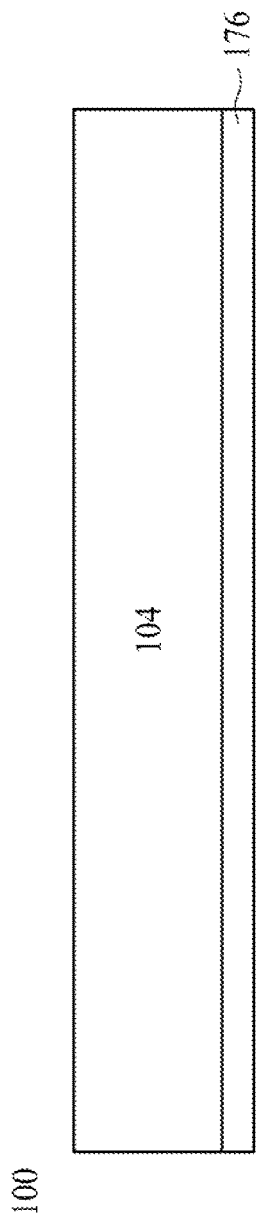
FIGS. 5A-5N illustrate cross-sectional views of intermediate stages for forming the vertical grating coupler in accordance with the method of FIG. 4.

Referring now to FIG. 4, there is shown a method 400 for forming the vertical grating coupler in accordance with some embodiments. Discussion of the method 400 of FIG. 4 references FIGS. 5A-5N, which illustrate cross-sectional views of intermediate stages for forming the vertical grating coupler 100 in accordance with the method 400. The method 400 begins at step 402, whereupon the first optical routing layer 104 is deposited on a substrate 176. FIG. 5A provides an illustrative view of the formation of the first optical routing layer 104 on the substrate 176. The substrate 176 may be implemented as a wafer made of a semiconducting material. Such materials can include, for example and without limitation, silicon in the form of crystalline Si or polycrystalline Si. The substrate may also be made from other elementary semiconductors such as germanium or $Al_2O_3$ (sapphire), or may include a compound semiconductor such as silicon carbide (SiC), gallium nitride (GaN), gallium arsenide (GaAs), indium arsenide (InAs), and indium phosphide (InP), or from other materials such as glass, a ceramic, or a dielectric material.

In FIG. 5A, the first optical routing layer 104 may be formed, i.e., deposited and/or patterned, on the substrate 176 as an electrically insulative material. The first optical routing layer 104 may be formed on the substrate 176 using processes such as thermal oxidation, atomic layer deposition (ALD) or chemical vapor deposition (CVD), including plasma-enhanced atomic layer deposition (PEALD) or plasma-enhanced chemical vapor deposition (PECVD). In particular embodiments, the first optical routing layer is formed from silicon dioxide ($SiO_2$).

Figure 5B:
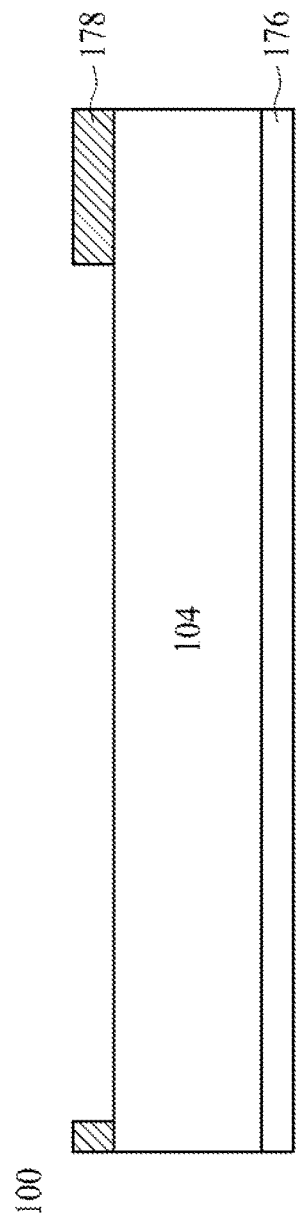

At step 404, a photoresist 178 is then deposited and patterned on the first optical routing layer 104, as shown in FIG. 5B. The photoresist 178 may be applied, for example, by spin coating, or by spraying, roller coating, dip coating, or extrusion coating. Typically, in spin coating, the substrate 176 is placed on a rotating platen, which may include a vacuum chuck that holds the substrate 176 in plate. The photoresist 178 is then applied to the center of the first optical routing layer 104 on the substrate 176. The speed of the rotating platen is then increased to spread the photoresist 178 evenly from the center of the substrate 176 to the perimeter of the substrate 176. The rotating speed of the platen is then fixed, which can control the thickness of the final photoresist layer. The photoresist 178 can be baked or cured to remove the solvent and harden the photoresist layer. The photoresist 178 is then exposed to patterned light, and then developed to obtain a patterned photoresist layer.

Figure 5C:
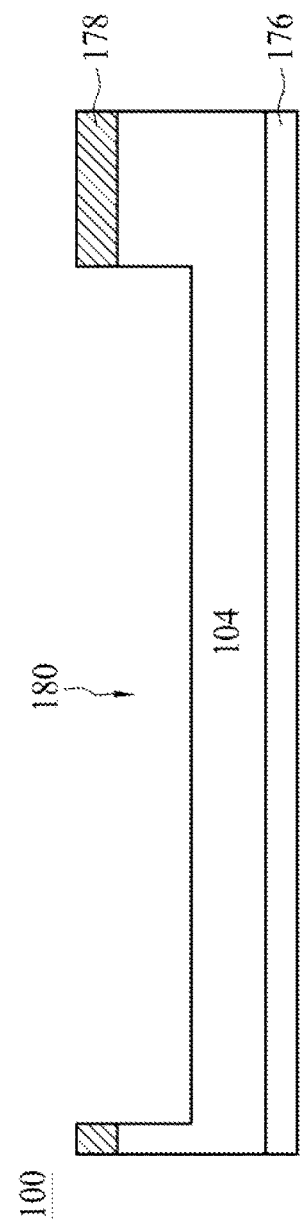

The first optical routing layer 104 is then etched at step 406 to remove a portion of the first optical routing layer 104 not protected by the photoresist 178, forming an opening 180 within the first optical routing layer as shown in FIG. 5C. Generally, any etching step used herein may be performed using wet etching, dry etching, or plasma etching processes such as reactive ion etching (RIE) or inductively coupled plasma (ICP), as appropriate. The etching may be anisotropic. Depending on the material, etchants may include carbon tetrafluoride ($CF_4$), hexafluoroethane ($C_2F_6$), octafluoropropane ($C_3F_8$), fluoroform ($CHF_3$), difluoromethane ($CH_2F_2$), fluoromethane ($CH_3F$), trifluoromethane ($CHF_3$), carbon fluorides, nitrogen ($N_2$), hydrogen ($H_2$), oxygen ($O_2$), argon (Ar), xenon (Xe), xenon difluoride ($XeF_2$), helium (He), carbon monoxide (CO), carbon dioxide ($CO_2$), fluorine ($F_2$), chlorine ($C_{12}$), oxygen ($O_2$), hydrogen bromide (HBr), nitric acid ($HNO_3$), hydrofluoric acid (HF), ammonium fluoride ($NH_4F$), nitrogen trifluoride ($NF_3$), sulfur hexafluoride ($SF_6$), boron trichloride ($BCl_3$), ammonia ($NH_3$), bromine ($Br_2$), nitrogen trifluoride ($NF_3$), or the like, or combinations thereof in various ratios.

Figure 5D:
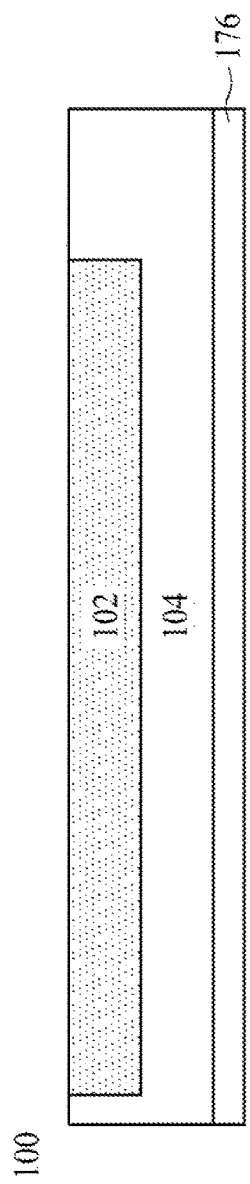

At step 408, a first waveguide 102 is then formed in the opening 180 of the first optical routing layer 104, as shown in FIG. 5D. In particular embodiments, the first waveguide 102 comprises silicon nitride ($Si_3N_4$). Silicon nitride can be deposited using PECVD or low pressure chemical vapor deposition (LPCVD) by the reaction of dichlorosilane ($SiH_2Cl_2$) with ammonia ($NH_3$). The patterned photoresist 178 is then removed, resulting in the intermediate stage of processing illustrated in FIG. 5D.

Figure 5E:
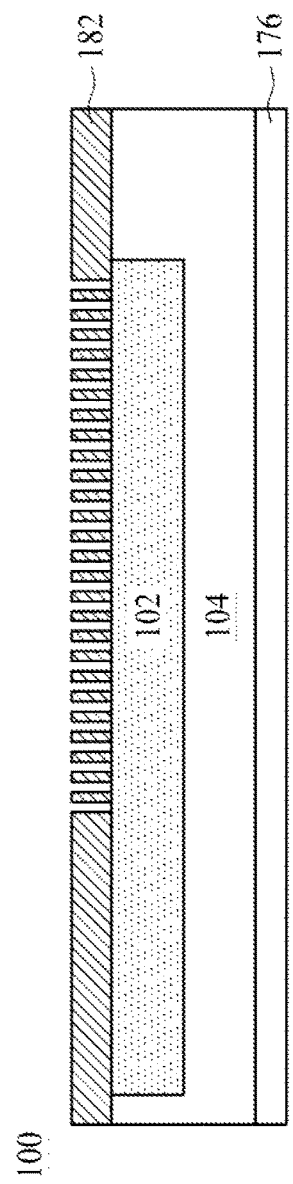
Figure 5F:
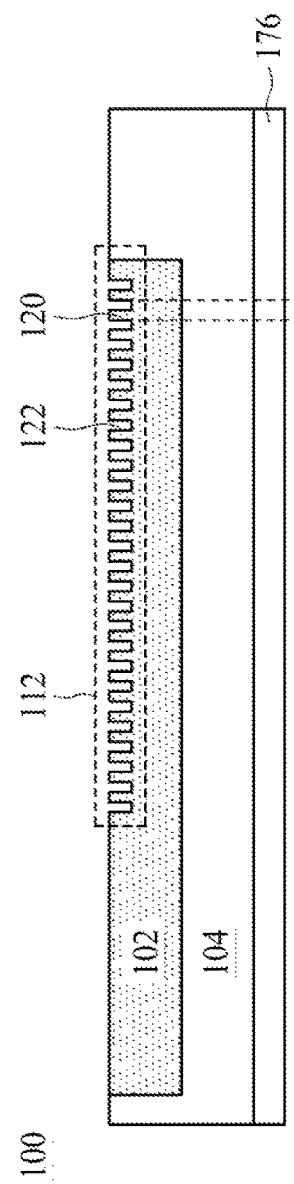

At step 410, another photoresist 182 is then deposited and patterned on the portion of the first optical layer 104 exposed adjacent the first waveguide 102 and on a portion of the first waveguide 102, as illustrated in FIG. 5E. The vertical grating coupler 100 is then etched, at step 412, to form the first grating 112, i.e., remove portions of the first waveguide 102 to form the first grating gaps 122 between first grating ridges 120. As indicated above, any suitable etching step may be used herein including, for example and without limitation, wet etching, dry etching, or plasma etching processes such as reactive ion etching (RIE) or inductively coupled plasma (ICP). The photoresist 182 is then removed, resulting in the vertical grating coupler 100 illustrated in FIG. 5F. It will be appreciated the patterning of the photoresist 182 at step 410 and the etching of the first waveguide 102 at step 412 corresponds to the formation of the first grating period 116 of the first grating 112, as illustrated in FIG. 5F.

Figure 5G:
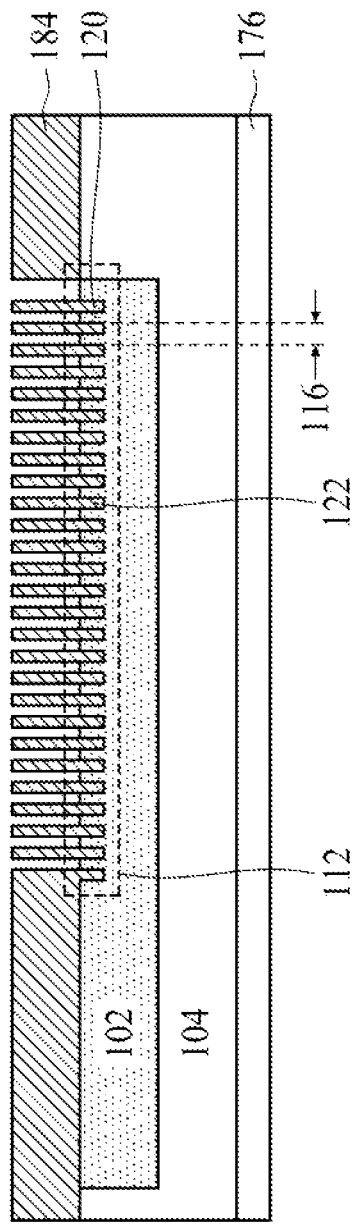
Figure 5H:
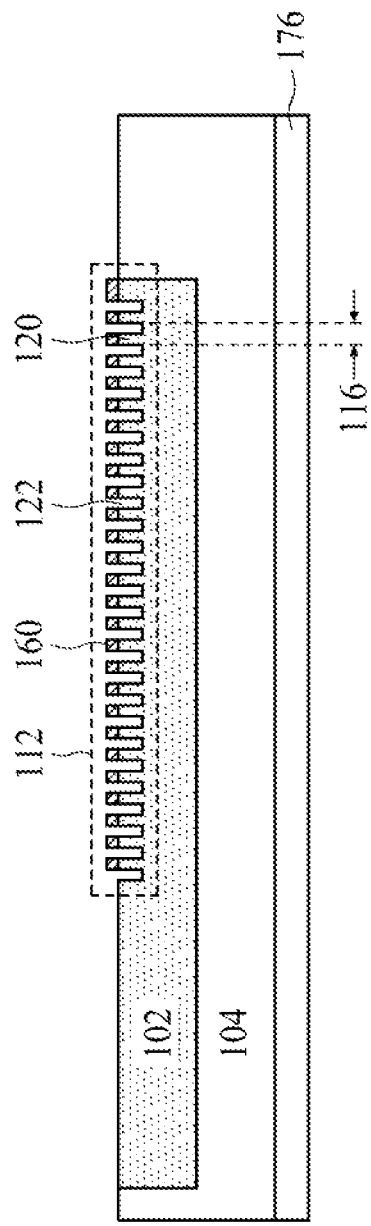

Steps 414-416 illustrate an optional formation of an overlay 160 on the ridges 120 of the first grating 112, as shown in FIGS. 5G-5H. Thus, at step 414, a photoresist 184 is deposited and patterned on portions of the first optical routing layer 104, the first waveguide 102, and within the first grating gaps 122, leaving the top of the first grating ridges 120 exposed. Deposition and patterning of the photoresist 184 may be performed in accordance with the methods as set forth above with respect to the initial photoresist 178 described at step 404. At step 416, an overlay 160 is deposited on the vertical grating coupler 100, and the photoresist 184 is subsequently removed, resulting in the intermediate state of manufacture of the vertical grating coupler 100 illustrated in FIG. 5H. In accordance with some embodiments, the overlay 160 may be formed from a dielectric material that has a higher refractive index than the dielectric layer 110, e.g., an oxide or other insulative material.

Figure 5I:
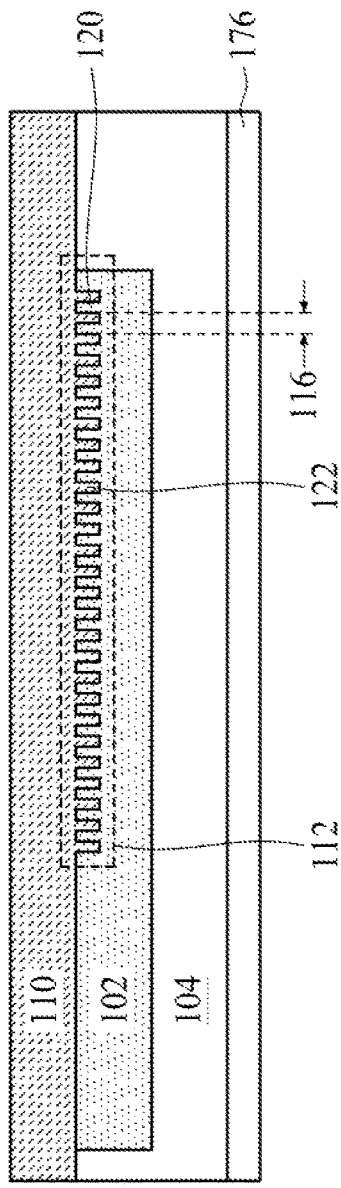

After formation of the overlay 160 at steps 414-416, or after etching of the first waveguide 102 at step 412, operations proceed to step 418, whereupon the dielectric layer 110 is formed on the vertical grating coupler 100, as shown in FIG. 5I. In accordance with some embodiments, the dielectric layer 110 may be constructed of a high-K material, such as, for example and without limitation, zirconium oxide, hafnium oxide, $SiO_2$, silicon oxynitride, aluminum oxide, zirconium silicate, hafnium oxynitride, zirconium oxynitride, boron nitride, hafnium silicate, silicon carbide, silicon, silicon nitride, or other highly refractive dielectric material. As illustrated in FIG. 5I, the dielectric layer 110 is deposited so as to fill the first grating gaps 122. Suitable deposition methods for forming the dielectric layer 110 include, for example and without limitation, thermal oxidation, ALD or CVD, including PEALD or PECVD.

Figure 5J:
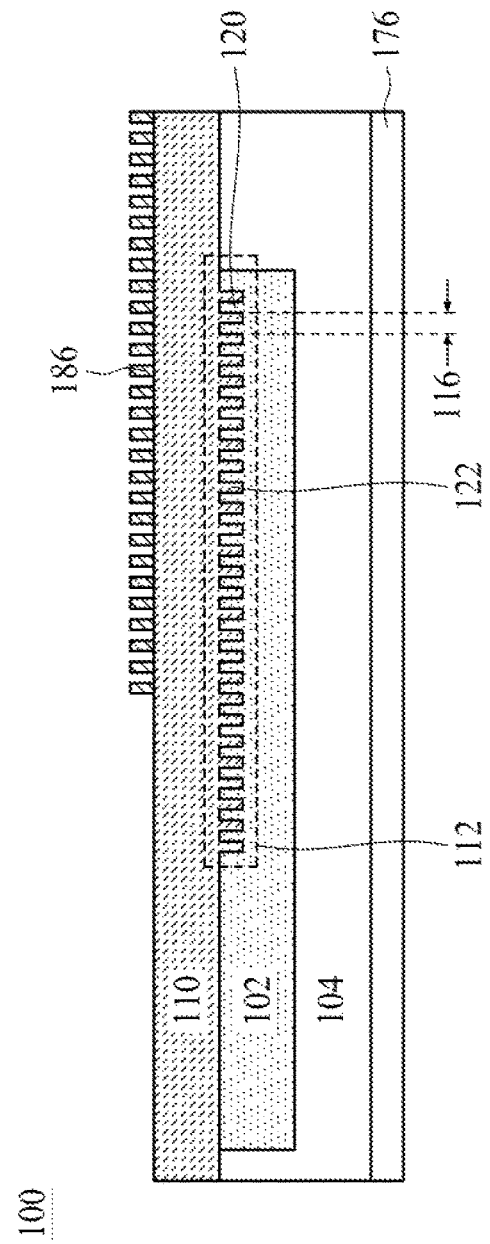
Figure 5K:
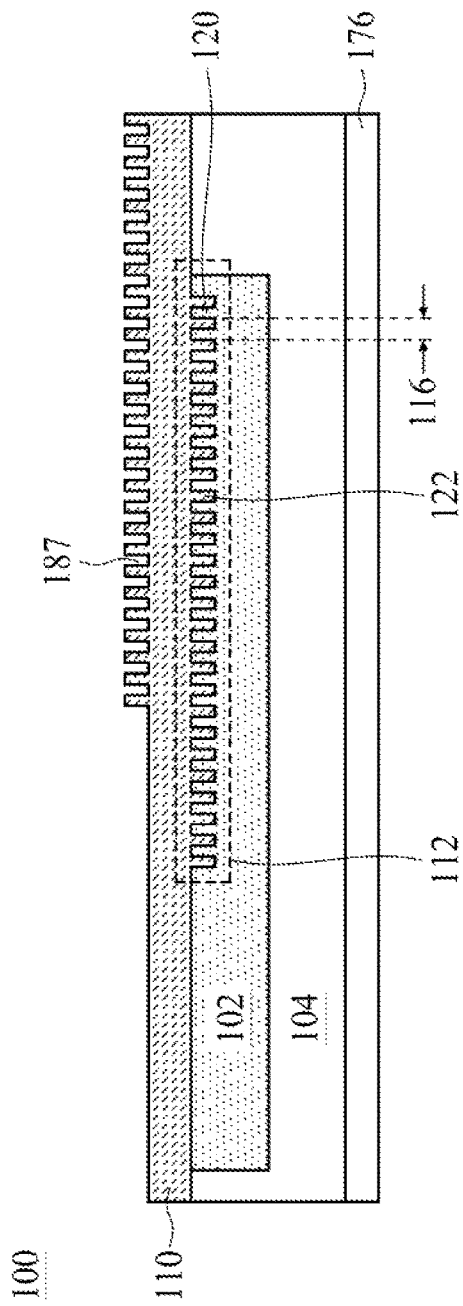

At step 420, another photoresist 186 is deposited and patterned on the dielectric layer 110 as illustrated in FIG. 5J. At 422, etching is performed on the dielectric layer 110 to remove portions of the dielectric layer 110 not protected by the patterned photoresist 186, thereby forming a plurality of grooves 187 into which the material of the second waveguide 106 may be deposited to form the second grating 114. As indicated above, any suitable etching step may be used herein including, for example and without limitation, wet etching, dry etching, or plasma etching processes such as reactive ion etching (RIE) or inductively coupled plasma (ICP). The photoresist 182 is then removed, resulting in the vertical grating coupler 100 with the grooves 187 illustrated in FIG. 5K.

Figure 5L:
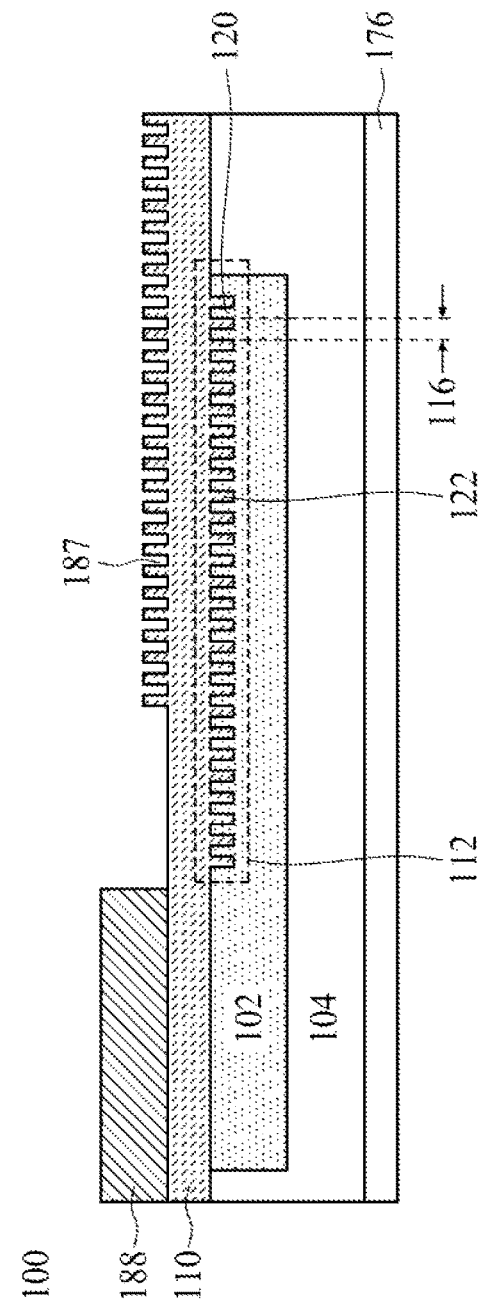

At step 424, another photoresist 188 is deposited and patterned on the vertical grating coupler 100, as illustrated in FIG. 5L. The second waveguide 106 is then formed on the vertical grating coupler 100 at step 426. Suitable deposition methods for forming the second waveguide 106 include, for example and without limitation, thermal oxidation, ALD or CVD, including PEALD or PECVD. It will be appreciated that via the previous patterning of the dielectric layer 110 at step 422, the material of the second waveguide 106 covers the exposed portion of the dielectric layer 110, thereby filing any openings, i.e., the grooves 187, therein. That is, the second grating 114 is formed in the vertical grating coupler 100 via the deposition of the second waveguide 106. As shown in FIG. 5M, the second waveguide 106 formed at step 426 is positioned above the first waveguide 102. Further, as illustrated in FIG. 5M, the first grating 112 and the second grating 114 are located within the vertical overlap region 115. Thereafter, at step 428, the second optical routing layer 108 is formed on the second waveguide 106, resulting in the vertical grating coupler 100 illustrated in FIG. 5N.

Figure 6:
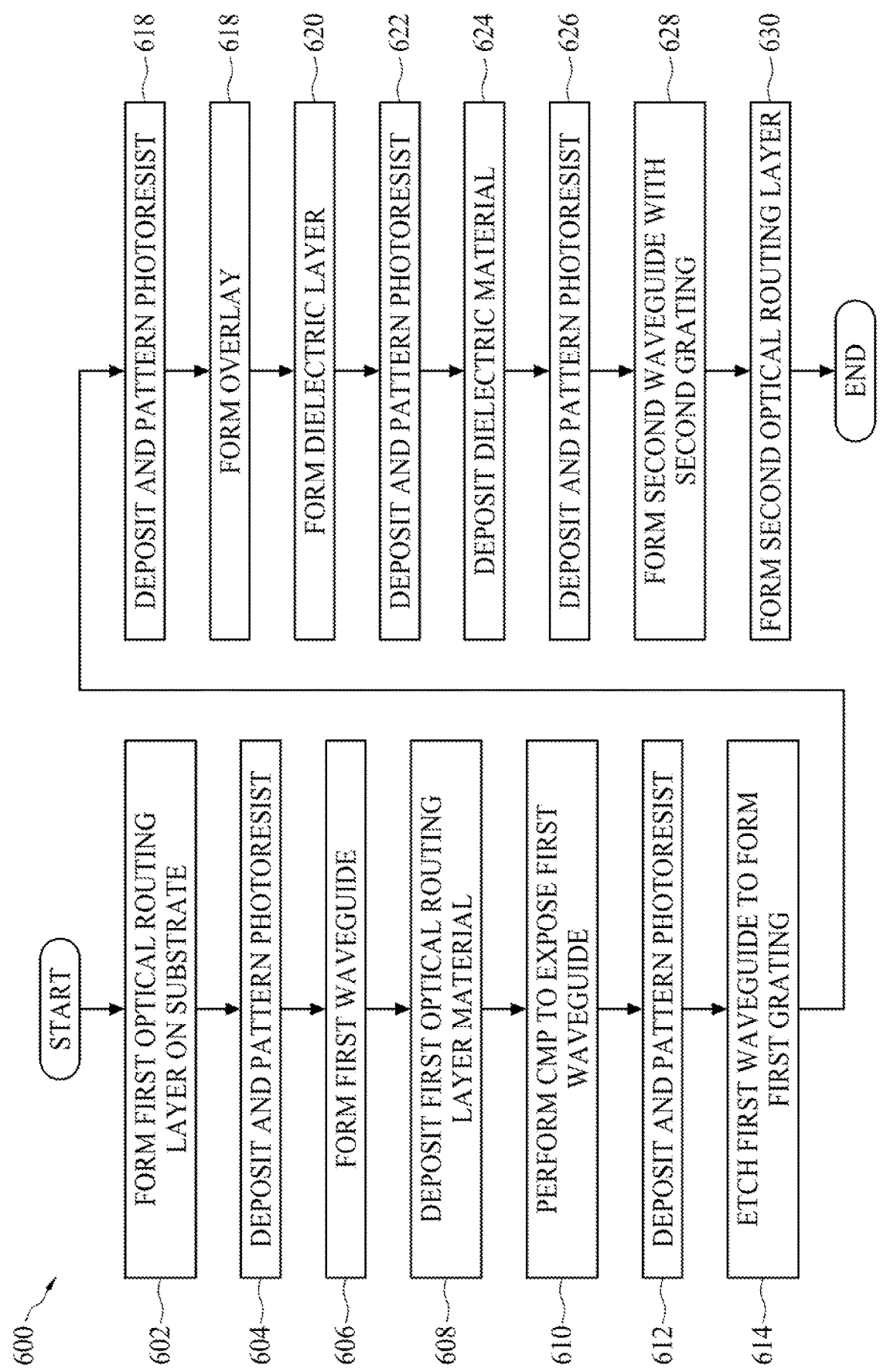
FIG. 6 is a flowchart illustrating a second method for forming the vertical grating coupler in accordance with some embodiments.
Figure 7A:
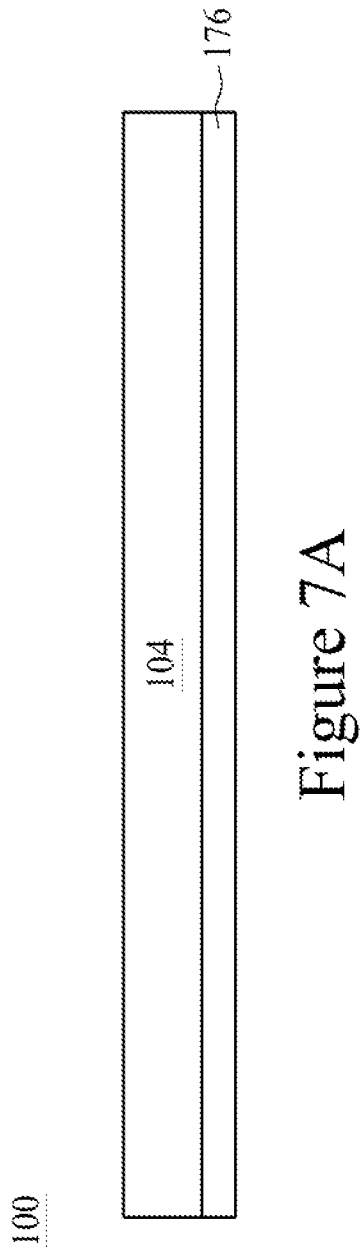
FIGS. 7A-7O illustrate cross-sectional views of intermediate stages for forming the vertical grating coupler in with the method of FIG. 6.

Turning now to FIG. 6, there is shown a method 600 for forming the vertical grating coupler in accordance with a second embodiment. The method 600 of FIG. 6 will be better understood in conjunction with cross-sectional views of the intermediate stages of manufacturing the vertical grating coupler 100 illustrated in FIGS. 7A-7O. The method 600 begins at step 602, whereupon the first optical routing layer 104 is deposited on a substrate 176. FIG. 7A provides an illustrative view of the formation of the first optical routing layer 104 on the substrate 176. The substrate 176 may be implemented as a wafer made of a semiconducting material. Such materials can include, for example and without limitation, silicon in the form of crystalline Si or polycrystalline Si. The substrate may also be made from other elementary semiconductors such as germanium or $Al_2O_3$ (sapphire), or may include a compound semiconductor such as silicon carbide (SiC), gallium nitride (GaN), gallium arsenide (GaAs), indium arsenide (InAs), and indium phosphide (InP), or from other materials such as glass, a ceramic, or a dielectric material.

In FIG. 7A, the first optical routing layer 104 may be formed, i.e., deposited and/or patterned, on the substrate 176 as an electrically insulative material. The first optical routing layer 104 may be formed on the substrate 176 using processes such as thermal oxidation, atomic layer deposition (ALD) or chemical vapor deposition (CVD), including plasma-enhanced atomic layer deposition (PEALD) or plasma-enhanced chemical vapor deposition (PECVD). In particular embodiments, the first optical routing layer 104 is formed from silicon dioxide ($SiO_2$).

Figure 7B:
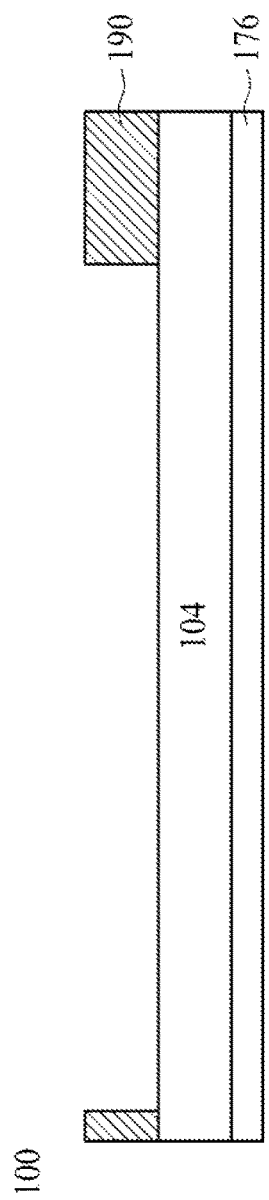

At step 604, a photoresist 190 is then deposited and patterned on the first optical routing layer 104, as shown in FIG. 7B. The photoresist 190 may be applied, for example, by spin coating, or by spraying, roller coating, dip coating, or extrusion coating. Typically, in spin coating, the substrate 176 is placed on a rotating platen, which may include a vacuum chuck that holds the substrate 176 in plate. The photoresist 190 is then applied to the center of the first optical routing layer 104 on the substrate 176. The speed of the rotating platen is then increased to spread the photoresist 190 evenly from the center of the substrate 176 to the perimeter of the substrate 176. The rotating speed of the platen is then fixed, which can control the thickness of the final photoresist layer. The photoresist 190 can be baked or cured to remove the solvent and harden the photoresist layer. The photoresist 190 is then exposed to patterned light, and then developed to obtain a patterned photoresist layer.

Figure 7C:
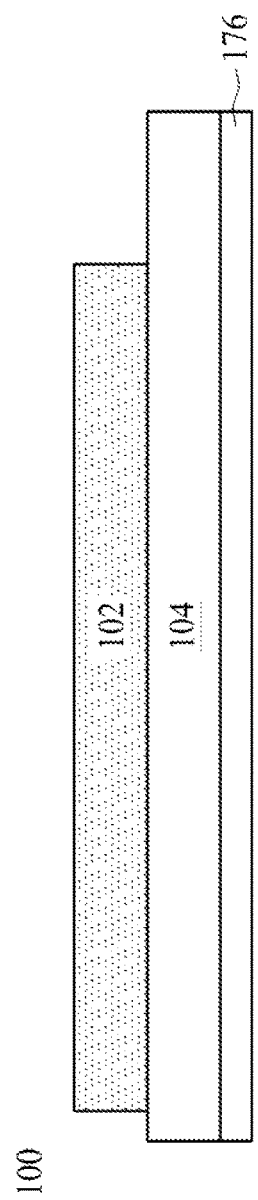

At step 606, a first waveguide 102 is then formed on the portion of the first optical routing layer 104 exposed by the patterned photoresist 190. In particular embodiments, the first waveguide 102 comprises silicon nitride ($Si_3N_4$). Silicon nitride can be deposited using PECVD or low pressure chemical vapor deposition (LPCVD) by the reaction of dichlorosilane ($SiH_2Cl_2$) with ammonia ($NH_3$). The patterned photoresist 190 is then removed, resulting intermediate stage of processing illustrated in FIG. 7C.

Figure 7D:
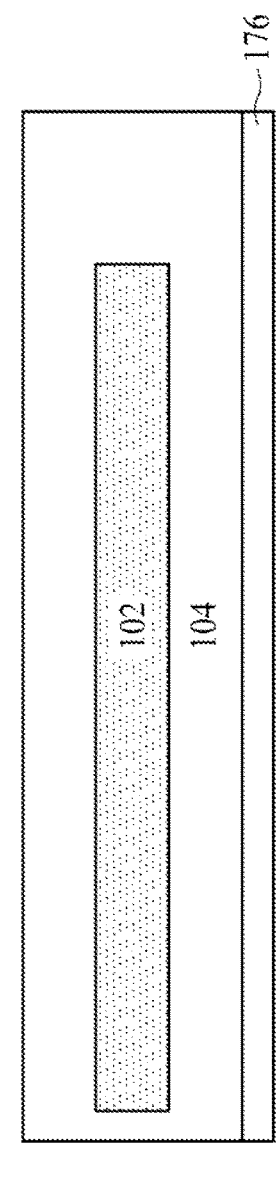
Figure 7E:
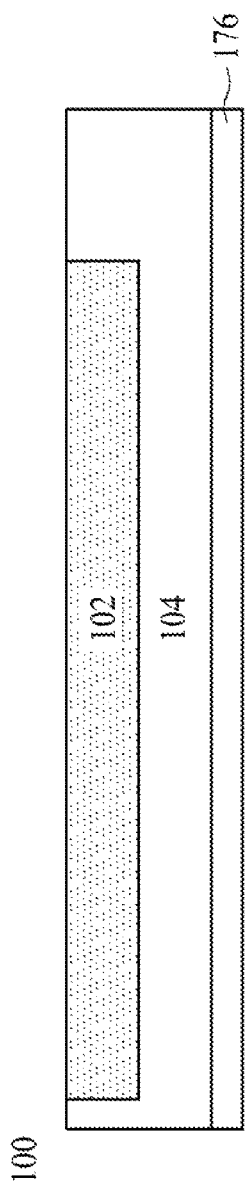

At step 608, a second deposition of the first optical routing layer material is performed on the exposed portions of the first optical routing layer 104 and the first waveguide 102, as illustrated in FIG. 7D. At step 610, chemical-mechanical planarization (or polishing) (CMP) is performed on the vertical grating coupler 100 to remove excess portions of the first optical routing layer 104 and expose the first waveguide 102, resulting in the vertical grating coupler 100 illustrated in FIG. 7E.

Figure 7F:
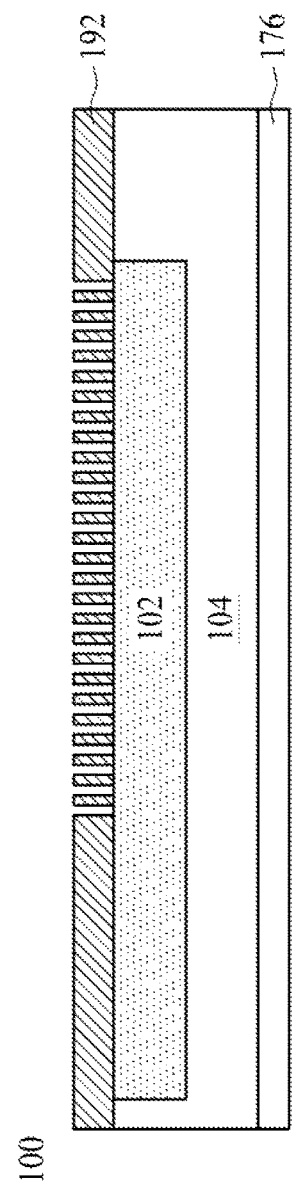
Figure 7G:
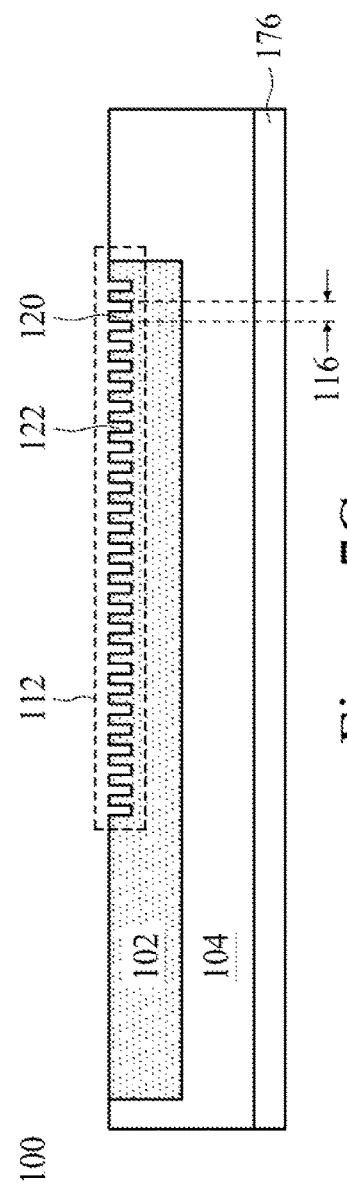

At step 612, another photoresist 192 is then deposited and patterned on the portion of the first optical layer 104 exposed adjacent the first waveguide 102 and on a portion of the first waveguide 102, as illustrated in FIG. 7F. The vertical grating coupler 100 is then etched, at step 614, to form the first grating 112, i.e., remove portions of the first waveguide 102 to form the first grating gaps 122 between first grating ridges 120. As indicated above, any suitable etching step may be used herein including, for example and without limitation, wet etching, dry etching, or plasma etching processes such as reactive ion etching (RIE) or inductively coupled plasma (ICP). The photoresist 192 is then removed, resulting in the vertical grating coupler 100 illustrated in FIG. 7G. It will be appreciated the patterning of the photoresist 192 at step 612 and the etching of the first waveguide 102 at step 614 corresponds to the formation of the first grating period 116 of the first grating 112, as illustrated in FIG. 7G.

Steps 616-618 illustrate an optional formation of an overlay 160 on the ridges 120 of the first grating 112, as shown in FIGS. 7H-7I. Thus, at step 616, a photoresist 194 is deposited and patterned on portions of the first optical routing layer 104, the first waveguide 102, and within the first grating gaps 122, leaving the top of the first grating ridges 120 exposed. Deposition and patterning of the photoresist 194 may be performed in accordance with the methods as set forth above with respect to the initial photoresist 190 described at step 604. At step 618, an overlay 160 is deposited on the vertical grating coupler 100, and the photoresist 194 is subsequently removed, resulting in the intermediate state of manufacture of the vertical grating coupler 100 illustrated in FIG. 7I. In accordance with some embodiments, the overlay 160 may be formed from a dielectric material that has a higher refractive index than the dielectric layer 110, e.g., an oxide or other insulative material.

Figure 7J:
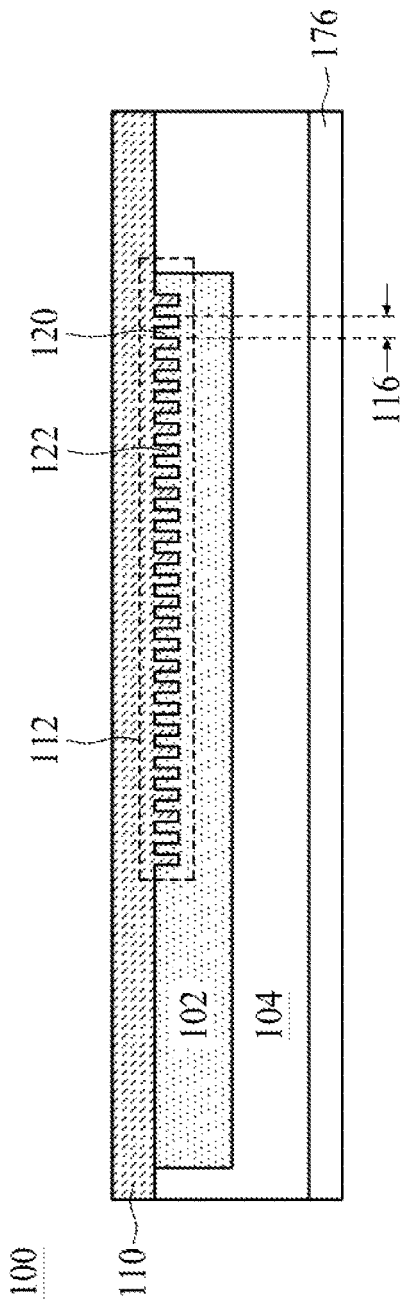

After formation of the overlay 160 at steps 616-618, or after etching of the first waveguide 102 at step 614, operations proceed to step 620, whereupon the dielectric layer 110 is formed on the vertical grating coupler 100, as shown in FIG. 7J. In accordance with some embodiments, the dielectric layer 110 may be constructed of a high-K material, such as, for example and without limitation, zirconium oxide, hafnium oxide, $SiO_2$, silicon oxynitride, aluminum oxide, zirconium silicate, hafnium oxynitride, zirconium oxynitride, boron nitride, hafnium silicate, silicon carbide, silicon, silicon nitride, or other highly refractive dielectric material. As illustrated in FIG. 7J, the dielectric layer 110 is deposited so as to fill the first grating gaps 122. Suitable deposition methods for forming the dielectric layer 110 include, for example and without limitation, thermal oxidation, ALD or CVD, including PEALD or PECVD.

Figure 7K:
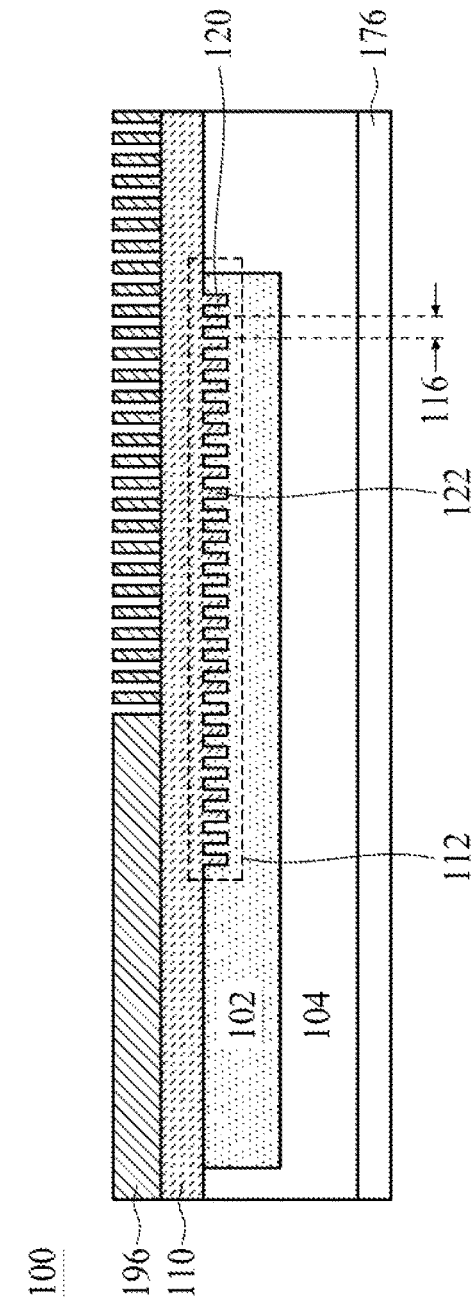
Figure 7L:
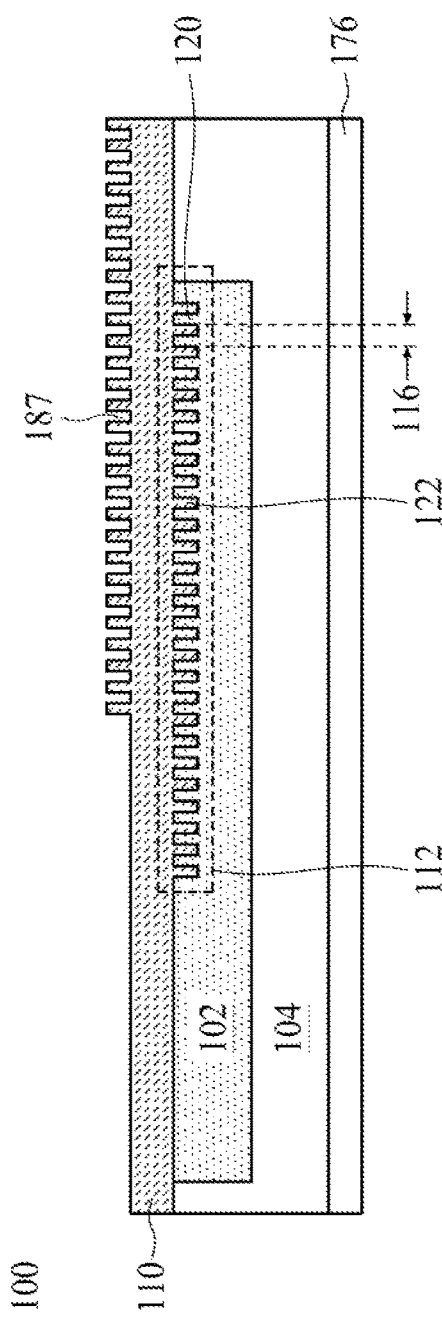
Figure 7M:
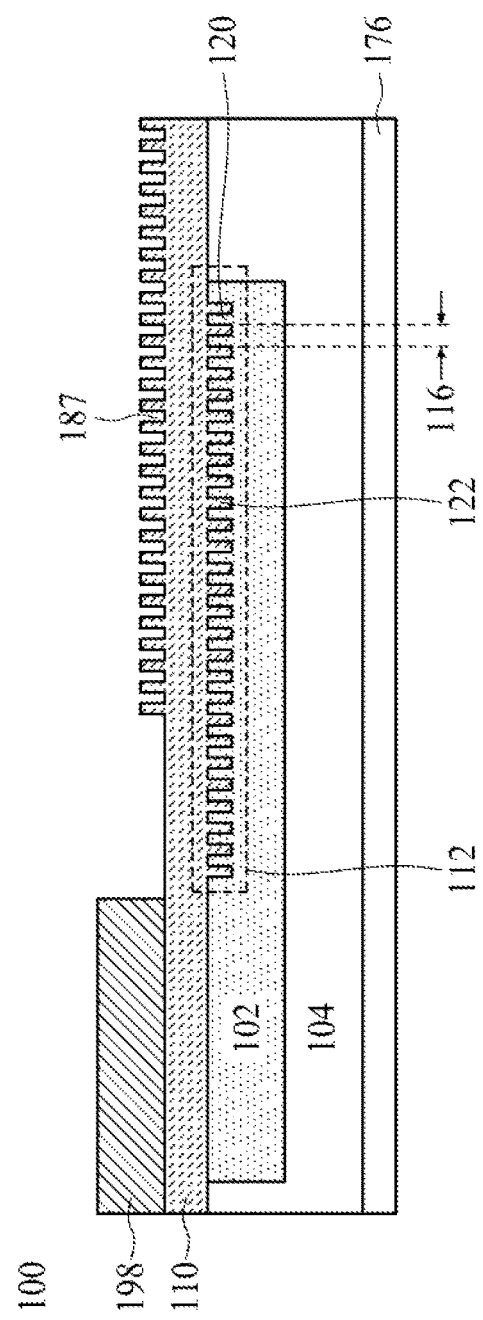

At step 622, another photoresist 196 is deposited and patterned on the dielectric layer 110 as illustrated in FIG. 7K. At step 624, dielectric layer material is deposited in accordance with the patterned photoresist 196 to form a plurality of grooves 187, which is then removed resulting in the intermediate stage of manufacture of the vertical grating coupler 100 of FIG. 7L. At step 626, another photoresist 198 is deposited and patterned on the vertical grating coupler 100, as illustrated in FIG. 7M. The second waveguide 106 is then formed on the vertical grating coupler 100 at step 628. Suitable deposition methods for forming the second waveguide 106 include, for example and without limitation, thermal oxidation, ALD or CVD, including PEALD or PECVD. It will be appreciated that via the previous formation of the dielectric layer 110 at steps 624, the material of the second waveguide 106 covers the exposed portion of the dielectric layer 110, thereby filing any openings, i.e., the grooves 187, therein. That is, the second grating ridges 126 of the second grating 114 are formed in the vertical grating coupler 100 via the deposition of the second waveguide 106. As shown in FIG. 7N, the second waveguide 106 formed at step 628 is positioned above the first waveguide 102. Further, as illustrated in FIG. 7N, the first grating 112 and the second grating 114 are located within the vertical overlap region 115. Thereafter, at step 630, the second optical routing layer 108 is formed on the second waveguide 106, resulting in the vertical grating coupler 100 illustrated in FIG. 7O.

Figure 8:
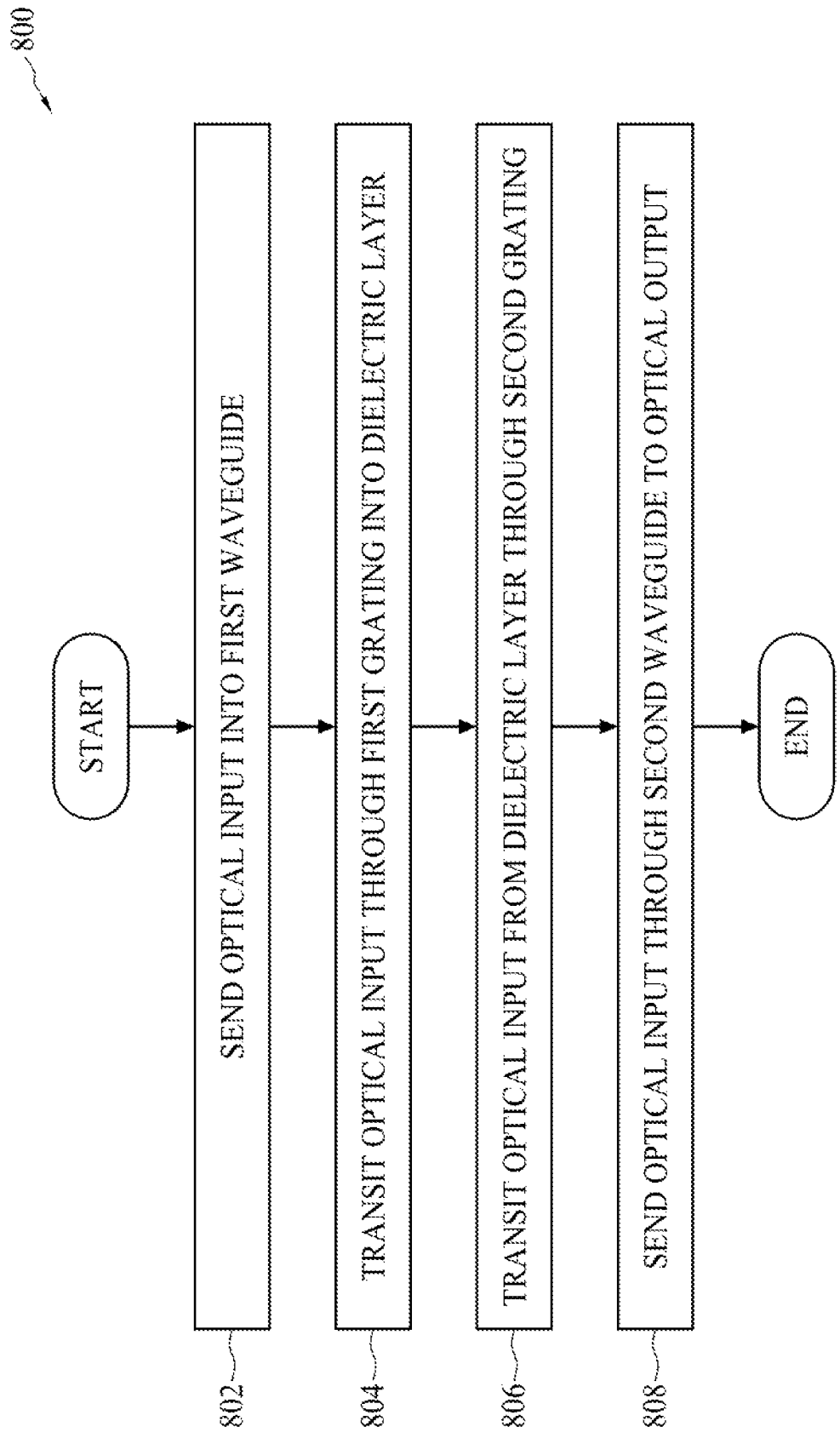
FIG. 8 is a flowchart illustrating a method for using the vertical grating coupler in accordance with some embodiments.

Turning now to FIG. 8, there is shown a flow chart illustrating a method 800 for using the vertical grating coupler 100, in accordance with some embodiments. At step 802, an optical input 150 is sent into a first waveguide 102. The optical input 150 comprises a plurality of different wavelengths. In step 802, the optical input 150 transits the first grating 112 into the dielectric layer 110. In step 804, the optical input 150 transits through the dielectric layer 110 to the second grating 114 formed within a second waveguide 106. In some embodiments, the first grating 112 and the second grating 114 are implemented with different grating periods 116, 118 (respectively). Further, the first grating 112 and the second grating 114 are positioned above each other, with the dielectric layer 110 disposed therebetween. At step 806, the optical input 150 is sent through the second waveguide 106 to an optical output 152.

The vertical photonic grating couplers of the present disclosure have several benefits. First, they greatly reduce the surface area and the length needed for the transition function, thus increasing component density for the overall SOI platform. The length of the grating may be reduced by more than one-half, because the thickness of the grating can be increased, which increases the reflection intensity. The thickness and apodization design between the two waveguides is greater than conventional designs, which reduces sensitivity to dimensional changes and avoids the influence of process variation and increases process tolerances. The design of the vertical grating couplers can be varied as desired to improve performance characteristics such as the reflection intensity or strength, the bandwidth, and/or the extinction ratio. The characteristics can be adjusted freely between layers, or can be used independently, or can be integrated between multiple layers. The process uses CMOS-compatible manufacturing processes, and is easily scalable. The grating couplers can also be easily integrated with other photonic components to obtain a large-scale photonic integrated circuit (PIC).

Additionally, the vertical grating couplers of the present disclosure utilize multiple layers of gratings with different period to couple light to another waveguide, with the upper and lower gratings designed to greatly reduce the surface and length required for coupling. Further, different layers of materials, as discussed in detail above (e.g., high-K materials) can be used to effectively increase the coupling strength, and with the gratings used in both waveguides, the coupling method between waveguides can be bidirectional. In addition, the vertical grating coupler achieves low loss by effectively increasing the directivity of the optical coupling, reducing the reflection, reducing the excess light remaining in the original (input) waveguide, and the like.

The vertical photonic grating couplers of the present disclosure can be used in many different types of photonic circuits. For example, they can be used in sub-wavelength multiplexers, multi-output demultiplexers, tunable Bragg resonators, tunable optical delay lines, optical couplers, optical splitters, and/or optical combiners.

Some embodiments disclosed herein the relate to vertical grating couplers that comprise a first waveguide, a second waveguide and a dielectric layer. The first waveguide includes a first grating that is formed in the first waveguide. The first grating includes a plurality of first grating ridges separated by a plurality of first grating gaps. The second waveguide includes a second grating that is formed in the second waveguide. The second grating includes a plurality of second grating ridges separated by a plurality of second grating gaps. The dielectric layer is positioned between the first and second waveguides, with the first grating, the second grating, and the dielectric layer are located in a vertical overlap region, each of the first grating and the second grating having a different grating period. Each of the plurality of first grating gaps and second grating gaps are filled with the dielectric layer.

Also disclosed herein are various methods for manufacturing a vertical grating coupler. A first waveguide is formed in a first optical routing layer on a substrate. A first grating is formed in the first waveguide. The first grating includes a plurality of first grating ridges and that has a first grating period. A dielectric layer is formed above the first waveguide from a first dielectric material. A plurality of grooves are etched in the dielectric layer, and a second waveguide is formed on the dielectric layer in a second optical routing layer on the substrate. A second grating is formed on the second waveguide that includes a plurality of second grating ridges in the plurality of grooves and that has a second grating period. The first waveguide, the first grating, the second grating, and the second waveguide overlap in a vertical overlap region.

Also disclosed herein are methods for using a vertical grating coupler. The method includes sending an optical input into a first waveguide, the optical input comprising a plurality of different wavelengths. The method further includes transiting the optical input from the first waveguide through a first grating in the first waveguide into a dielectric layer. The method also includes transiting the optical input from the dielectric layer into a second waveguide through a second grating disposed in the second waveguide, the first grating and the second grating positioned opposite each other with the dielectric layer located therebetween. The method also includes sending the optical input through the second waveguide to an optical output.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for fabricating a vertical grating coupler, comprising:
   forming a first waveguide in a first optical routing layer on a substrate;
   forming a first grating in the first waveguide, the first grating comprising a plurality of first grating ridges separated by a plurality of first grating gaps and having a first grating period;
   forming a dielectric layer above the first waveguide from a first dielectric material, the dielectric layer filling the plurality of first grating gaps;
   etching a plurality of grooves in the dielectric layer; and
   forming a second waveguide on the dielectric layer in a second optical routing layer on the substrate, wherein a second grating comprising a plurality of second grating ridges separated by the plurality of grooves in the dielectric layer and having a second grating period is formed therein,
   wherein the first waveguide, the first grating, the second grating, and the second waveguide overlap in a vertical overlap region;
   wherein the first grating period and the second grating period have a different grating period, and wherein the first grating and the second grating are apodized.

2. The method of claim 1, wherein the dielectric layer has a thickness of about 1 nanometer to 1100 nanometers.

3. The method of claim 1, wherein the first waveguide and the second waveguide are comprised of silicon nitride or silicon.

4. The method of claim 1, further comprising forming an overlay on the plurality of first grating ridges prior to forming the dielectric layer.

5. The method of claim 4, wherein the overlay has a thickness of about 10% to about 50% of the ridge.

6. The method of claim 1, wherein the dielectric layer has a thickness of about 1 nanometer to 1100 nanometers.

7. The method of claim 1, wherein the first grating period of the first grating is about 100 nanometers to about 500 nanometers.

8. The method of claim 1, wherein the second grating period of the second grating is about 100 nanometers to about 500 nanometers.

9. The method of claim 1, wherein the first grating has a width of about 5% to about 99% of a width of an output width of the first waveguide.

10. The method of claim 1, wherein the second grating has a width of about 5% to about 99% of a width of an input of the second waveguide.

11. The method of claim 1, wherein the first waveguide and the second waveguide each have a thickness of about 10 nanometers to about 1200 nanometers.

12. The method of claim 1, wherein the first waveguide and the second waveguide each have a width of about 200 nanometers to about 2000 nanometers.

13. The method of claim 1, wherein the dielectric layer comprises a high-K material.

14. A vertical grating coupler, comprising:
   a first waveguide having a first grating formed therein, the first grating including a plurality of first grating ridges separated by a plurality of first grating gaps;
   a second waveguide having a second grating formed therein, the second grating including a plurality of second grating ridges separated by a plurality of second grating gaps; and
   a dielectric layer positioned between the first waveguide and the second waveguide, wherein the first grating, the second grating, and the dielectric layer are located in a vertical overlap region, each of the first grating and the second grating having a different grating period, and wherein each of the plurality of first grating gaps and second grating gaps are filled with the dielectric layer, and wherein the first grating and the second grating are apodized.

15. The vertical grating coupler of claim 14, wherein the first waveguide and the second waveguide comprise silicon nitride.

16. The vertical grating coupler of claim 14, wherein the dielectric layer has a thickness of about 1 nanometer to 1100 nanometers.

17. The vertical grating coupler of claim 14, wherein the first grating has a width of about 5% to about 99% of a width of an output width of the first waveguide, and wherein the second grating has a width of about 5% to about 99% of a width of an input of the second waveguide.

18. The vertical grating coupler of claim 14, wherein the first waveguide and the second waveguide each have a width of about 200 nanometers to about 2000 nanometers.

19. A method for using a vertical grating coupler, comprising:
   sending an optical input into a first waveguide, the optical input comprising a plurality of different wavelengths;
   transiting the optical input from the first waveguide through a first grating disposed on the first waveguide into a dielectric layer, wherein the first grating has a plurality of first grating gaps;
   transiting the optical input from the dielectric layer into a second waveguide through a second grating disposed on the second waveguide, wherein the second grating has a plurality of second grating gaps, and the first grating and the second grating are positioned opposite each other with the dielectric layer located therebetween; and sending the optical input through the second waveguide to an optical output;

wherein the first grating, the second grating, and the dielectric layer are located in a vertical overlap region, wherein each of the plurality of first grating gaps and second grating gaps are filled with the dielectric layer, wherein the first grating and the second grating have different grating periods, and wherein the first grating and the second grating are apodized.

20. The method of claim 19, wherein the first waveguide and the second waveguide each have a width of about 200 nanometers to about 2000 nanometers.

\* \* \* \* \*